(12) United States Patent
Noda et al.

(10) Patent No.: US 6,568,811 B2
(45) Date of Patent: May 27, 2003

(54) COLOR IMAGE DISPLAY DEVICE AND PROJECTION-TYPE IMAGE DISPLAY APPARATUS

(75) Inventors: Hitoshi Noda, Osaka (JP); Hiroaki Sato, Hyogo (JP); Shigekazu Yamagishi, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 44 days.

(21) Appl. No.: 09/870,909

(22) Filed: May 31, 2001

(65) Prior Publication Data

US 2001/0050661 A1 Dec. 13, 2001

(30) Foreign Application Priority Data

Jun. 12, 2000 (JP) .......................................... 2000-175418
Jun. 12, 2000 (JP) .......................................... 2000-175419
Oct. 20, 2000 (JP) .......................................... 2000-320574

(51) Int. Cl.$^7$ ........................ G03B 21/00; G03B 21/26; G02B 26/08
(52) U.S. Cl. ........................ 353/31; 353/34; 353/37; 359/201; 359/204; 359/212; 359/216; 359/223
(58) Field of Search .................... 353/31, 9, 34, 353/37, 81, 7, 8; 349/5, 7, 8, 15; 348/744, 51, 55, 742, 743, 54, 56; 359/464, 462, 209, 211, 201, 204, 212, 216, 223; 347/232

(56) References Cited

U.S. PATENT DOCUMENTS

| | | | | |
|---|---|---|---|---|
| 5,654,817 A | * | 8/1997 | De Loor | 359/201 |
| 5,845,981 A | | 12/1998 | Bradley | 353/31 |
| 5,929,979 A | * | 7/1999 | Okino et al. | 355/60 |
| 6,169,562 B1 | | 1/2001 | Morimoto | 347/232 |
| 6,170,953 B1 | * | 1/2001 | Lee et al. | 353/82 |
| 6,175,440 B1 | * | 1/2001 | Conemac | 359/204 |
| 6,433,930 B1 | | 8/2002 | Son | 359/464 |
| 2001/0038484 A1 | | 11/2001 | Harada | 359/204 |

FOREIGN PATENT DOCUMENTS

| | | | |
|---|---|---|---|
| EP | 0 492 721 | 7/1992 | ............ H04N/9/31 |
| JP | 4-316296 | 11/1992 | ............ H04N/9/31 |
| JP | 6-148635 | 5/1994 | ......... G02F/1/1335 |
| JP | 7-318939 | 12/1995 | ......... G02F/1/1335 |
| JP | 9-512648 | 12/1997 | .......... G02B/27/18 |
| JP | 10-142548 | 5/1998 | .......... G02B/26/10 |
| JP | 11-24164 | 1/1999 | .......... G03B/21/00 |
| JP | 2000-28960 | 1/2000 | .......... G02B/27/18 |
| JP | 2000-207750 | 7/2000 | .......... G11B/7/085 |
| WO | WO 96/03842 | 2/1996 | ............ H04N/9/31 |

\* cited by examiner

*Primary Examiner*—Russell Adams
*Assistant Examiner*—Melissa J Koval
(74) *Attorney, Agent, or Firm*—Merchant & Gould, P.C.

(57) ABSTRACT

Belt-like regions illuminated by red, green and blue light beams are formed on an image display panel, and the illuminated regions are moved continuously. Each pixel of the image display panel is driven by a signal corresponding to the color of light entering the pixel. This makes it possible to display a color image with only one image display panel having neither a color filter nor a pixel exclusively for the respective light beams. The adjacent regions illuminated by two colors of light are overlapped partially, and the pixels in the overlapping portions are driven by a brightness signal component. By overlapping the adjacent illuminated regions, a focused area of the light beams can be enlarged, achieving a smaller focusing optical system, making it possible to reduce the size of the entire device.

30 Claims, 21 Drawing Sheets

(i) R,G,B>A → R'=R-X, G'=G-X, B'=B-X, W'=X (ii) C>R>A     → R'=R, G'=G, B'=B, W'=0  (Same in G and B)
    GorB<A (iii) R>C      → R'=R-X, G'=G-X, B'=B-X, W'=X  (Same in G and B)
     GorB<A

COLOR IMAGE DISPLAY DEVICE AND PROJECTION-TYPE IMAGE DISPLAY APPARATUS

BACKGROUND OF THE INVENTION

1. Field of the Invention

The present invention relates to a color image display device and a projection-type image display apparatus that display a color image with one light valve as a light modulating member.

2. Description of Related Art

Along with a sufficient supply of video equipment and video software such as a video tape recorder and a video disk player, the demand for a large screen image display apparatus for enjoying powerful images has become intensified in recent years. As a conventional large screen image display apparatus, there is an image display apparatus that uses a liquid crystal panel (a light valve) for an image display portion so as to modulate light emitted from a light source spatially by the liquid crystal panel and project an image onto a screen. Currently commercialized image display apparatus using the liquid crystal panel can be classified roughly into a three-plate system using three liquid crystal panels and a single-plate system using one liquid crystal panel.

FIG. 21 shows a configuration of one example of the conventional three-plate system image display apparatus.

Light emitted from a lamp 901 as a light source and light reflected by a reflection mirror 902 are converged by a focusing lens 903, and then separated into red, green and blue components of primary colors by a blue-reflecting dichroic mirror 904 and a green-reflecting dichroic mirror 905. Light beams of these primary colors respectively are directed to a liquid crystal panel for red light 912, a liquid crystal panel for green light 913 and a liquid crystal panel for blue light 914, combined by a color combination prism 915, and then projected onto a screen 917 by a projection lens 916. In this figure, total reflection mirrors 906, 907 and 908 change optical paths of the light beams, and lenses 909, 910 and 911 adjust the incident angles of the light beams entering the respective liquid crystal panels. A white light source used for the lamp 901 as the light source is, for example, a discharge-type extra-high pressure mercury vapor lamp or metal halide lamp, or a thermoluminescence-type halogen lamp.

The liquid crystal panel for red light 912, the liquid crystal panel for green light 913 and the liquid crystal panel for blue light 914 are driven by a video signal for red light, a video signal for green light and a video signal for blue light respectively. The light irradiated by the lamp 901 is modulated spatially when passing through the respective liquid crystal panels, and projected onto the screen 917 by the projection lens 916 as an image.

FIG. 22 shows a configuration of one example of the conventional single-plate system image display apparatus.

Light emitted from a lamp 931 as a light source and light reflected by a reflection mirror 932 are converged by a focusing lens 933, and then irradiated on a liquid crystal panel 940. The liquid crystal panel 940 is constituted by a mosaic color filter substrate 941 and a TFT array substrate 942 as shown in FIG. 23. When a white light beam from the lamp 931 passes through the color filter 941, red, green and blue light beams of primary colors are obtained. These light beams of primary colors that have passed through the liquid crystal panel 940 are projected onto a screen 935 by a projection lens 934.

In the conventional three-plate system image display apparatus described above (see FIG. 21), the liquid crystal panel is driven by the video signal so that the liquid crystal panel changes transmittance of the light, thereby modulating the light spatially so as to display the image. Since the entire spectrum of the white light from the lamp can be utilized, the image display apparatus of this system has a high efficiency of light utilization. However, the necessity of the three liquid crystal panels, a color separation optical system, a color combination optical system and a convergence adjusting mechanism between the liquid crystal panels has posed a problem in that this system is relatively expensive.

On the other hand, the conventional single-plate system image display apparatus described above (see FIGS. 22 and 23) is compact and inexpensive because the image formed on the liquid crystal panel having the mosaic color filter simply is magnified and projected onto the screen. However, since this system obtains desired light of the primary colors by absorbing light with an unwanted color using the color filter, the efficiency of light utilization is low (one-third or less), making it very difficult to increase brightness.

SUMMARY OF THE INVENTION

In an image display apparatus using a single image display panel, it is a first object of the present invention to provide a color image display device and a projection-type image display apparatus that can utilize light from a light source effectively and display a high-brightness image. Also, it is a second object of the present invention to provide a small color image display device and a small projection-type image display apparatus using a single image display panel. Furthermore, in the apparatus achieving the above objects, it is a third object of the present invention to provide a color image display device and a projection-type image display apparatus that are provided with a preferable adjusting means.

In order to achieve the above-mentioned objects, the present invention has the following configurations.

A color image display device according to a first configuration of the present invention includes a light source portion for emitting respective light beams of red, green and blue, an image display panel provided with many pixels for modulating an incident light according to color signals of at least red, green and blue, an optical system for directing the respective light beams to enter the image display panel so that the respective light beams from the light source portion form belt-like illuminated regions at different positions on the image display panel and the regions illuminated by the respective light beams move continuously on the image display panel, and an image display panel driving circuit for driving each of the pixels of the image display panel. Each of the pixels is driven by a signal corresponding to a color of light entering this pixel, thereby displaying a color image. The respective light beams are directed to enter the image display panel so that the illuminated regions adjacent to each other on the image display panel partially overlap each other. The pixel that the light beams of the overlapping two colors enter is driven by a brightness signal component.

With this first configuration, the color image can be displayed using only one image display panel having neither a color filter nor a pixel exclusively for the respective light beams. Moreover, since the red, green and blue light beams are irradiated simultaneously on different regions on the image display panel so as to display red, green and blue images on these regions simultaneously, it is possible to utilize light effectively and display a high-brightness image.

Also, unlike the case of the conventional color image display apparatus using the single image display panel (see FIG. 22), the image display panel does not have the pixels exclusively for displaying the red, green and blue images. Therefore, ⅓ of the number of the pixels of the conventional image display panel (see FIG. 23) is sufficient for the image display panel of the present invention, allowing a cost reduction.

Furthermore, by partially overlapping the illuminated regions of the adjacent two colors on the image display panel, a focused area of the light beams can be made larger than that in the case without any overlapping portion, achieving a smaller focusing optical system, and making it possible to reduce the size of the entire device. Moreover, a point light source does not have to be used. In addition, by using the light of the overlapping portions for the display of a brightness component, the light from the light source portion can be utilized effectively, achieving a still higher brightness.

In the first configuration described above, it is preferable to further include a video signal processing circuit in which the color signals of red, green and blue are inputted, the brightness signal component is detected from the color signals, and signals obtained by subtracting the brightness signal component from the color signals and the brightness signal component are outputted to the image display panel driving circuit. With this preferable configuration, it is possible to display a bright color image with excellent color purity and brightness gradation characteristics.

Next, a color image display device according to a second configuration of the present invention includes a light source portion for emitting respective light beams of red, green and blue, an image display panel provided with many pixels for modulating an incident light according to color signals of at least red, green and blue, an optical system for directing the respective light beams to enter the image display panel so that the respective light beams from the light source portion form belt-like illuminated regions at different positions on the image display panel and the regions illuminated by the respective light beams move continuously on the image display panel, and an image display panel driving circuit for driving each of the pixels of the image display panel. Each of the pixels is driven by a signal corresponding to a color of light entering this pixel, thereby displaying a color image. The color image display device further includes a drive timing adjusting circuit for adjusting a timing of the signal that drives each of the pixels so as to correspond to a change of the color of light entering this pixel.

With this second configuration, the color image can be displayed using only one image display panel having neither a color filter nor a pixel exclusively for the respective light beams. Moreover, since the red, green and blue light beams are irradiated simultaneously on different regions on the image display panel so as to display red, green and blue images on these regions simultaneously, it is possible to utilize light effectively and display a high-brightness image.

Also, unlike the case of the conventional color image display apparatus using the single image display panel (see FIG. 22), the image display panel does not have the pixels exclusively for displaying the red, green and blue images. Therefore, ⅓ of the number of the pixels of the conventional image display panel (see FIG. 23) is sufficient for the image display panel of the present invention, allowing a cost reduction.

Furthermore, by adjusting the timing of the driving signal to be inputted to each of the pixels using the drive timing adjusting circuit, a switch timing of the color of light entering each of the pixels and a timing of the driving signal to be inputted to this pixel can be matched. As a result, the relative displacement of the regions illuminated by the respective light beams and width variation thereof in a moving direction owing to a structural tolerance of the optical systems can be corrected, thus displaying a color image with an excellent white balance.

In the second configuration described above, it is preferable that the drive timing adjusting circuit includes a test pattern switching controlling circuit provided with a circuit for outputting a test pattern signal and a switch circuit for selecting either the test pattern signal or an inputted video signal, and a delay controlling circuit for delaying an output signal of the test pattern switching controlling circuit for an arbitrary time. With this preferable configuration, it is possible to adjust the white balance easily.

Next, a color image display device according to a third configuration of the present invention includes a light source portion for emitting respective light beams of red, green and blue, an image display panel provided with many pixels for modulating an incident light according to color signals of at least red, green and blue, an optical system for directing the respective light beams to enter the image display panel so that the respective light beams from the light source portion form belt-like illuminated regions at different positions on the image display panel and the regions illuminated by the respective light beams move continuously on the image display panel, and an image display panel driving circuit for driving each of the pixels of the image display panel. Each of the pixels is driven by a signal corresponding to a color of light entering this pixel, thereby displaying a color image. The optical system includes a first optical system that the respective light beams from the light source portion enter, a rotating polygon mirror that has a plurality of reflecting surfaces and makes the respective light beams perform a scanning when the respective light beams having left the first optical system enter the reflecting surface and are reflected, and a second optical system for directing the respective light beams from the rotating polygon mirror to the image display panel. Chief rays of the respective light beams having left the first optical system enter the reflecting surface of the rotating polygon mirror at different positions from each other in a rotation direction of the rotating polygon mirror at different incident angles from each other, whereby the chief rays of the respective light beams reflected by the reflecting surface enter the second optical system at different angles from each other, and then enter the image display panel at different positions. The first optical system has an adjusting mechanism for adjusting the incident angles at which the chief rays of the respective light beams having left the first optical system enter the reflecting surface of the rotating polygon mirror, for each of the light beams.

With this third configuration, the color image can be displayed using only one image display panel having neither a color filter nor a pixel exclusively for the respective light beams. Moreover, since the red, green and blue light beams are irradiated simultaneously on different regions on the image display panel so as to display red, green and blue images on these regions simultaneously, it is possible to utilize light effectively and display a high-brightness image.

Also, unlike the case of the conventional color image display apparatus using the single image display panel (see FIG. 22), the image display panel does not have the pixels exclusively for displaying the red, green and blue images. Therefore, ⅓ of the number of the pixels of the conventional image display panel (see FIG. 23) is sufficient for the image display panel of the present invention, allowing a cost reduction.

Furthermore, by adjusting the relative positions of the illuminated regions of the respective light beams using the adjusting mechanism, a switch timing of the color of light entering each of the pixels and a timing of the driving signal to be inputted to this pixel can be matched. As a result, the relative displacement of the regions illuminated by the respective light beams owing to a structural tolerance of the optical systems can be corrected, thus displaying a color image with an excellent white balance.

In addition, the optical system is constituted by the rotating polygon mirror and the peripheral focusing optical system, making it possible to reduce the size, weight and cost of the device.

In the second and third configurations described above, it is preferable that the respective light beams are directed to enter the image display panel so that the illuminated regions adjacent to each other on the image display panel partially overlap each other, and the pixel that the light beams of the overlapping two colors enter is driven by a brightness signal component. With this preferable configuration, by partially overlapping the illuminated regions of the adjacent two colors on the image display panel, a focused area of the light beams can be made larger than that in the case without any overlapping portion, achieving a smaller focusing optical system, and making it possible to reduce the size of the entire device. Moreover, a point light source does not have to be used. In addition, by using the light of the overlapping portions for the display of a brightness component, the light from the light source portion can be utilized effectively, achieving a still higher brightness.

In the above preferable configurations, it is preferable further to include a video signal processing circuit in which the color signals of red, green and blue are inputted, the brightness signal component is detected from the color signal, and signals obtained by subtracting the brightness signal component from the color signals and the brightness signal component are outputted to the image display panel driving circuit. With this preferable configuration, it is possible to display a bright color image with excellent color purity and brightness gradation characteristics.

Alternatively, in the second and third configurations described above, a black display belt may be formed in a border of the illuminated regions adjacent to each other on the image display panel, and the pixel outside the black display belt may be driven by the signal corresponding to the color of light entering this pixel. With this configuration, it is possible to prevent the light beams of different colors from entering one pixel at the same time so as to deteriorate the color purity of the displayed image, thereby providing a color display having an excellent color reproducibility.

Next, a color image display device according to a fourth configuration of the present invention includes a light source portion for emitting respective light beams of red, green and blue, an image display panel provided with many pixels for modulating an incident light according to color signals of at least red, green and blue, an optical system for directing the respective light beams to enter the image display panel so that the respective light beams from the light source portion form belt-like illuminated regions at different positions on the image display panel and the regions illuminated by the respective light beams move continuously on the image display panel, and an image display panel driving circuit for driving each of the pixels of the image display panel. A black display belt is formed in a border of the illuminated regions adjacent to each other on the image display panel, and the pixel outside the black display belt is driven by a signal corresponding to a color of light entering this pixel.

With this fourth configuration, the color image can be displayed using only one image display panel having neither a color filter nor a pixel exclusively for the respective light beams. Moreover, since the red, green and blue light beams are irradiated simultaneously on different regions on the image display panel so as to display red, green and blue images on these regions simultaneously, it is possible to utilize light effectively and display a high-brightness image.

Also, unlike the case of the conventional color image display apparatus using the single image display panel (see FIG. 22), the image display panel does not have the pixels exclusively for displaying the red, green and blue images. Therefore, ⅓ of the number of the pixels of the conventional image display panel (see FIG. 23) is sufficient for the image display panel of the present invention, allowing a cost reduction.

Furthermore, a black display belt is formed in a border of the illuminated regions adjacent to each other on the image display panel, making it possible to prevent the light beams of different colors from entering one pixel at the same time so as to deteriorate the color purity of the displayed image, thereby providing a color display having an excellent color reproducibility.

In the first, second and fourth configurations described above, it is preferable that the optical system includes a first optical system that the respective light beams from the light source portion enter, a rotating polygon mirror that has a plurality of reflecting surfaces and makes the respective light beams perform a scanning when the respective light beams having left the first optical system enter the reflecting surface and are reflected, and a second optical system for directing the respective light beams from the rotating polygon mirror to the image display panel, and chief rays of the respective light beams having left the first optical system enter the reflecting surface of the rotating polygon mirror at different positions from each other in a rotation direction of the rotating polygon mirror at different incident angles from each other, whereby the chief rays of the respective light beams reflected by the reflecting surface enter the second optical system at different angles from each other, and then enter the image display panel at different positions. With this preferable configuration, the optical system is constituted by the rotating polygon mirror and the peripheral focusing optical system, making it possible to reduce the size, weight and cost of the device.

Also, in the first, second and fourth configurations described above, the optical system may include a first optical system that the respective light beams from the light source portion enter, an optical path turning device for switching optical paths of the respective light beams having left the first optical system in synchronization with a video signal, and a second optical system for directing the respective light beams having left the optical path turning device to the image display panel.

In this case, the optical path turning device can be constituted so as to switch the optical paths of the respective light beams by rotating a structure using an optical fiber, a polygon mirror or a prism.

Also, in the first to fourth configurations described above, the image display panel can be a transmission-type light valve or a reflection-type light valve.

Next, a projection-type image display apparatus of the present invention includes the color image display device with any of the first to fourth configurations described above as an image display portion and a projection optical system for magnifying and projecting an image of the image display panel.

With this configuration, the color image can be displayed using only one image display panel having neither a color filter nor a pixel exclusively for the respective light beams. Moreover, it is possible to utilize light effectively and display a high-brightness image.

In addition, ⅓ of the number of the pixels of the conventional projection-type image display apparatus that displays a color image using the single image display panel is sufficient for the image display panel of the present invention, allowing a cost reduction.

DESCRIPTION OF THE PREFERRED EMBODIMENTS

The following is a description of embodiments of the present invention, with reference to the accompanying drawings.

First Embodiment

Figure 1:
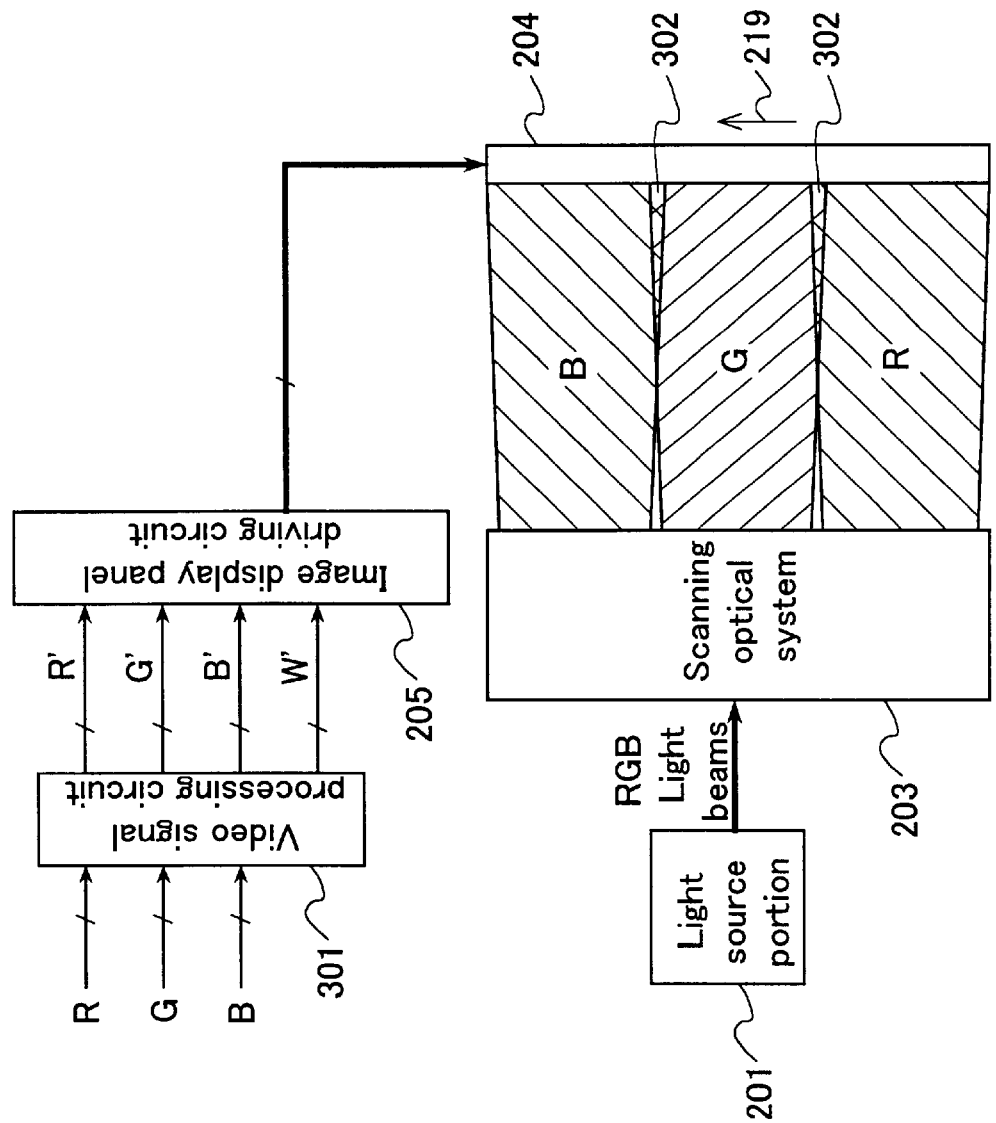
FIG. 1 is a view showing a configuration of a color image display device according to a first embodiment of the present invention.

FIG. 1 shows a configuration of a color image display device according to the first embodiment of the present invention.

The color image display device of the present embodiment includes an image display panel 204, a video signal processing circuit 301, an image display panel driving circuit 205, a light source portion 201 and a scanning optical system 203. The light source portion 201 emits light beams of R (red), G (green) and B (blue) toward the scanning optical system 203. The scanning optical system 203 directs the incident light beams to the image display panel 204 so as to illuminate the image display panel 204. On the image display panel 204, three substantially belt-like regions illuminated by the red, green and blue light beams that have substantially the same size are formed to align along a scanning direction 219. The longitudinal direction of the substantially belt-like illuminated regions is orthogonal to the scanning direction 219. The regions illuminated by those light beams move continuously in the scanning direction 219.

The illuminated regions adjacent to each other in the scanning direction 219 overlap each other so as to form an overlapping portion 302. By illuminating the image display panel 204 so that the adjacent light beams of different colors partially overlap each other on the image display panel 204 as described above, the area on which the light beams of the respective colors are focused increases on the image display panel 204. Thus, the f-number of an illumination optical system can be reduced, leading to a smaller size and reducing the need for using a point light source. In addition, the overlapping portion 302 is used for displaying images as in the description below, making it possible to utilize light effectively.

Next, an operation of a circuit portion will be described. The light beams of red (R), green (G) and blue (B) are outputted from the scanning optical system 203. The image display panel driving circuit 205 outputs image data for driving the image display panel 204 according to the output timing of these light beams, which scan and illuminate the image display panel 204. The video signal processing circuit 301 in the foregoing stage of the image display panel driving circuit 205 calculates a brightness signal component W' from each inputted signal of red (R), green (G) and blue (B) and outputs the result. When providing a brightness display period in addition to the display periods of red, green and blue, it is necessary to prevent a deterioration of color purity and maintain gradation characteristics during displaying a single color. For this purpose, the video signal processing circuit 301 is configured and an example of the circuit is shown in FIG. 2.

Figure 2:
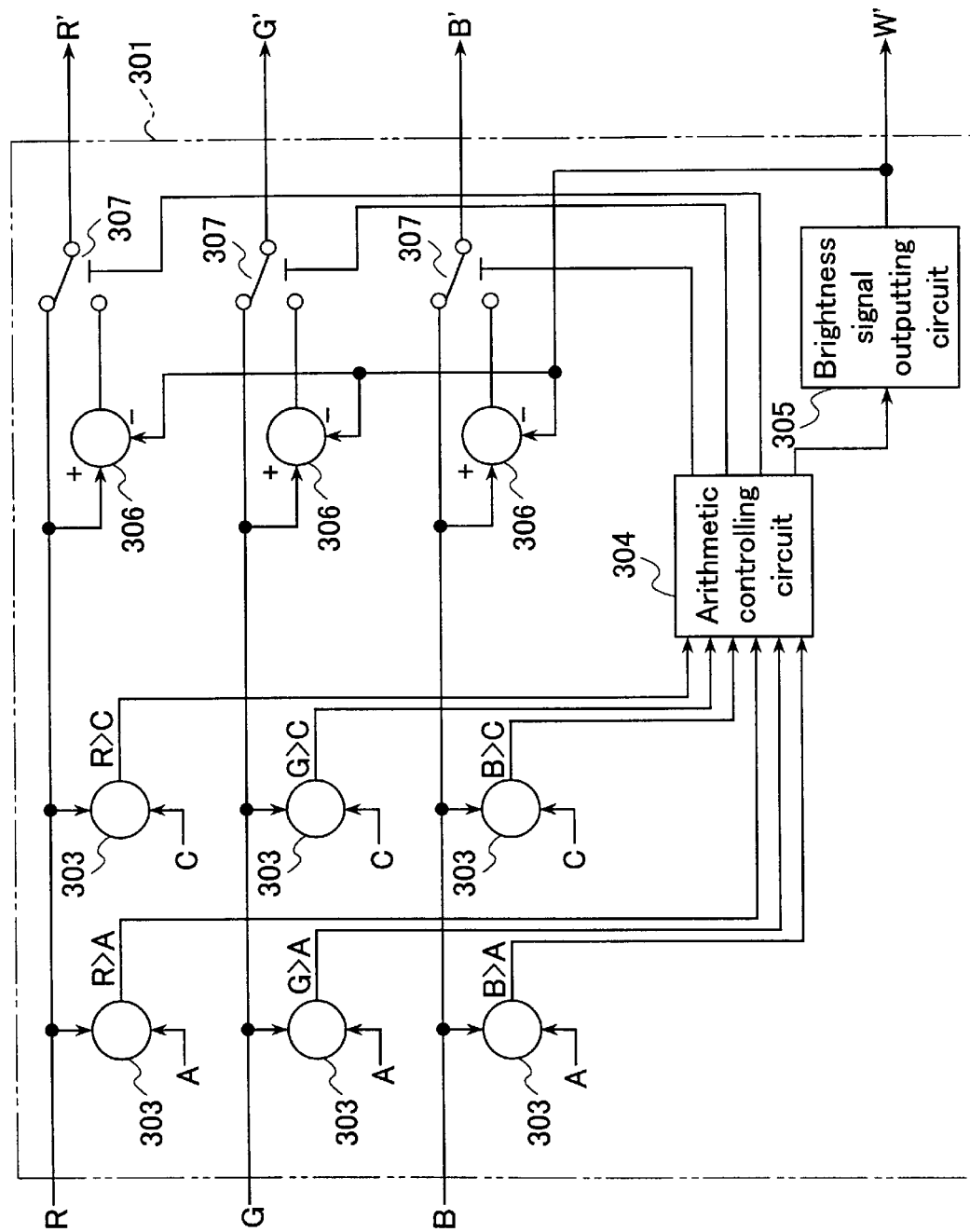
FIG. 2 is a block diagram showing a video signal processing circuit used in the color image display device of the first embodiment of the present invention.

As shown in FIG. 2, the video signal processing circuit 301 includes two channels of comparator circuits 303 that are inserted into each of signal input stages of R, G and B, an arithmetic controlling circuit 304, a brightness signal outputting circuit 305, and subtractor circuits 306 and switching circuits 307 that are provided in each of the signal processing stages of R, G and B. The video signal processing circuit 301 outputs signals of R', G' and B' and the brightness signal component W' that are obtained by the following calculation based on the inputted R, G and B signals.

Figure 3:
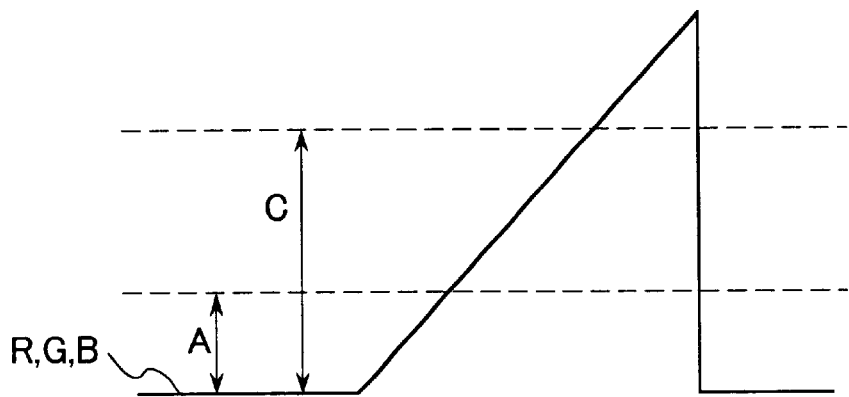
FIG. 3 is a drawing for describing a signal processing performed by the video signal processing circuit used in the color image display device of the first embodiment of the present invention.

The calculation processing will be described using FIG. 3. The inputted R, G and B signals are compared with signal amplitudes A and C in the two channels of the comparator circuits 303. The result is sent to the arithmetic controlling circuit 304, which performs an adaptive processing as described in the following.

When the input signals of R, G and B all have an amplitude larger than the amplitude A, the brightness signal component W' is outputted from the brightness signal outputting circuit 305. By controlling the subtractor circuits 306 and the switching circuits 307, the brightness signal component is subtracted from each of the input signals of R, G and B, thus obtaining R', G' and B' and outputting them (see FIG. 3(i)).

When one (or two) of the input signals of R, G and B has an amplitude larger than the amplitude A and smaller than the amplitude C, and the other two signals (or one signal) have an amplitude smaller than the amplitude A, the brightness signal component W' is not outputted. The inputted R, G and B signals are outputted without being subjected to any processing (through-outputted). This prevents the deterioration of the color purity (FIG. 3(ii)).

When one (or two) of the input signals of R, G and B has an amplitude larger than the amplitude C, and the other two signals (or one signal) have an amplitude smaller than the amplitude A, the brightness signal component W' is outputted. The brightness signal component is subtracted from each of the input signals of R, G and B, thus obtaining R', G' and B' and outputting them. This prioritizes the brightness of the display and the brightness gradation characteristics over the color purity (FIG. 3(iii)).

The R', G' and B' signals and the brightness signal component W' obtained by the calculation that are outputted from the video signal processing circuit 301 are inputted to the image display panel driving circuit 205. The image display panel driving circuit 205 drives the image display panel 204 based on these input signals.

Figure 4:
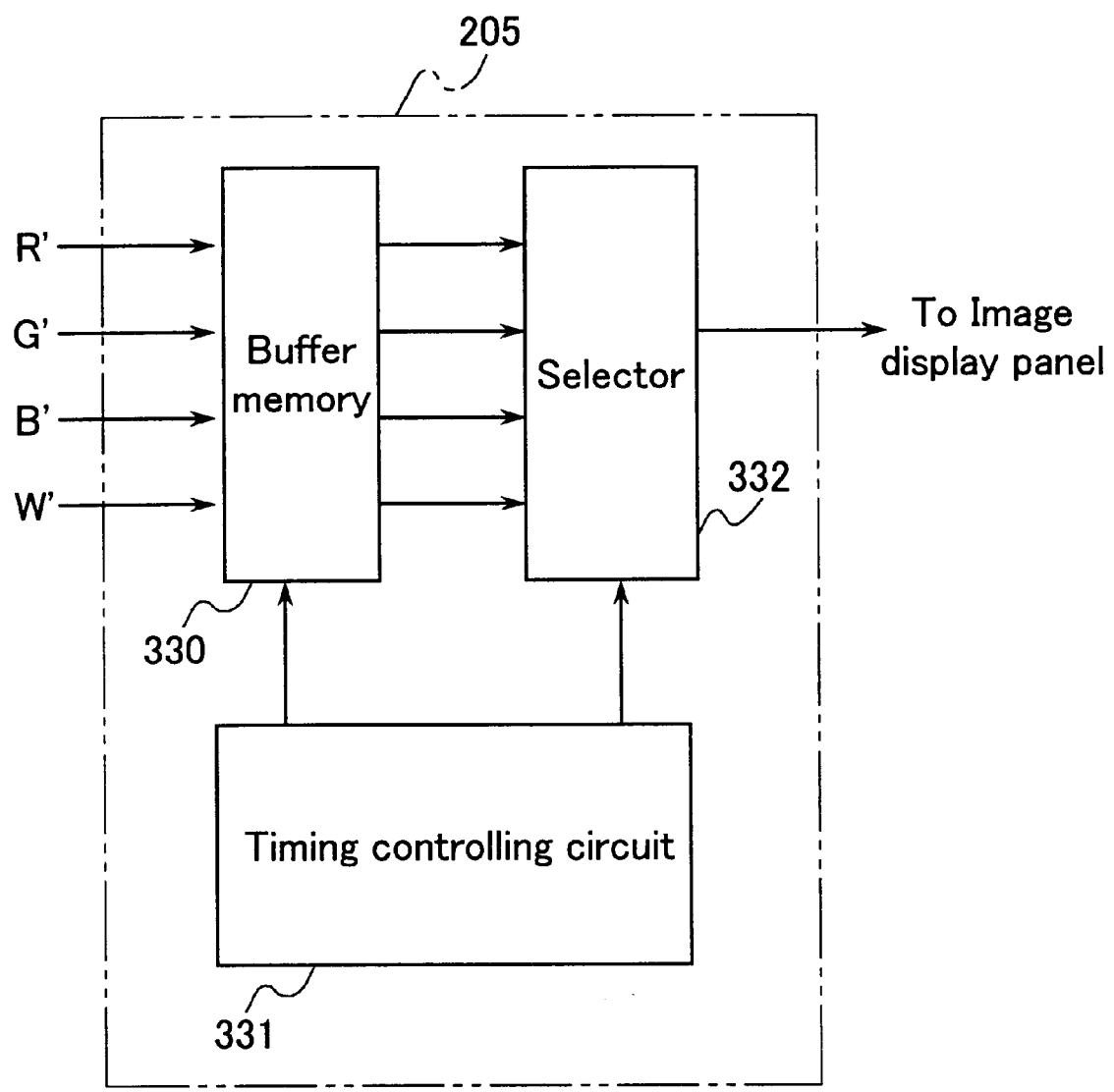
FIG. 4 is a block diagram showing an image display panel driving circuit used in the color image display device of the first embodiment of the present invention.

FIG. 4 shows an example of a configuration of the image display panel driving circuit 205. As shown in FIG. 4, the image display panel driving circuit 205 includes a buffer memory 330, a selector 332 and a timing controlling circuit 331. The R', G' and B' signals and the brightness signal component W' that are inputted therein are stored once in the buffer memory 330 for one frame or more. According to the timing of the output signal from the timing controlling circuit 331, the selector 332 switches colors of video signal data to be read out corresponding to the color of the illuminating light at every pixel and reads out necessary video signal data from the buffer memory 330. In this manner, each of the pixels on the image display panel 204 is driven by a signal corresponding to the switch timing of the illuminating light.

Figure 5:
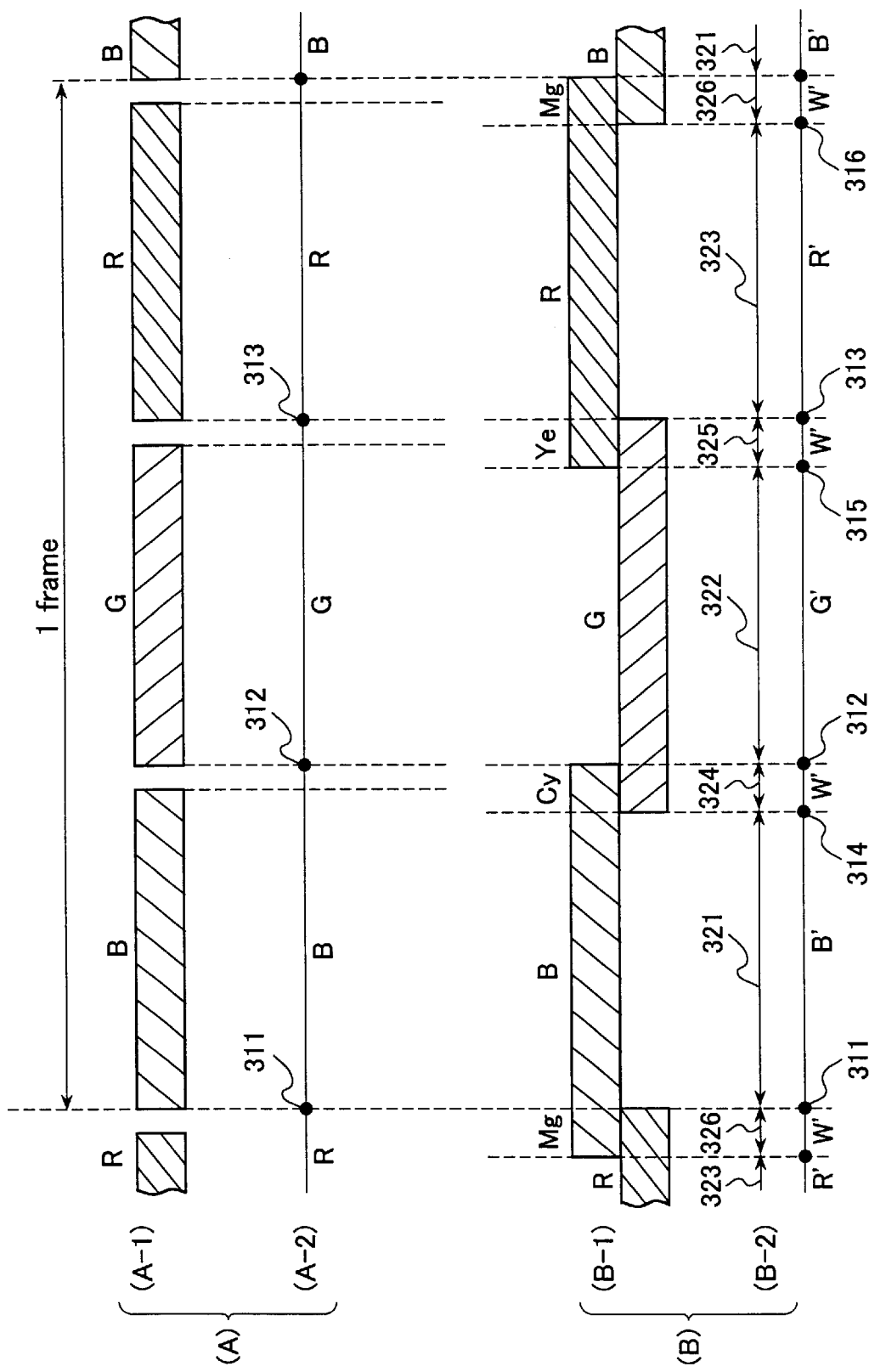
FIG. 5 is a timing chart showing relationships between illuminating light and a driving signal in the color image display device of the first embodiment of the present invention.

FIG. 5 shows relationships between the light illuminating an arbitrary pixel on the image display panel 204 and a driving signal to be inputted to this pixel. The transverse direction in FIG. 5 indicates a time base.

(A) in the upper part of FIG. 5 shows a case without any overlapping portion 302 of the adjacent illuminating light beams (see FIG. 1) unlike this first embodiment. In this case, the light beam illuminating the arbitrary pixel is switched sequentially to B (blue) in a timing 311, G (green) in a timing 312 and R (red) in a timing 313 within a period corresponding to one frame (see (A-1) in FIG. 5). Thus, by switching the signal for driving this pixel sequentially to a B (blue) signal in the timing 311, a G (green) signal in the timing 312 and a R (red) signal in the timing 313, it is possible to perform a driving corresponding to the color of the illuminating light (see (A-2) in FIG. 5).

(B) in the lower part of FIG. 5 shows a case of this first embodiment with the overlapping portion 302 of the adjacent illuminating light beams (see FIG. 1). In this case, the light beam illuminating the arbitrary pixel is switched sequentially to B (blue) in the timing 311, Cy (cyan: overlapping color of B (blue) and G (green)) in a timing 314, G (green) in the timing 312, Ye (yellow: overlapping color of G (green) and R (red)) in a timing 315, R (red) in the timing 313, and Mg (magenta: overlapping color of R (red) and B (blue)) in a timing 316 within a period corresponding to one frame (see (B-1) in FIG. 5). Thus, the signal for driving this pixel is switched sequentially to a B' (blue) signal in the timing 311, a W' signal (a brightness signal) in the timing 314, a G' (green) signal in the timing 312, the W' signal (the brightness signal) in the timing 315, a R' (red) signal in the timing 313 and the W' signal (the brightness signal) in the timing 316 (see (B-2) in FIG. 5). As described above, the pixel is driven by the brightness signal component in periods 324, 325 and 326 where the different colors of adjacent light beams are illuminated in such a manner as to overlap each other. Since the sum of mixed lights of R and G, G and B, and B and R produces white light, the driving according to the present embodiment makes it possible to add a brightness component to the display of the R, G and B signals.

The above-described drive timing processing shown in FIG. 5 is performed in the case of an analog driving used for a liquid crystal light valve or the like. On the other hand, in the case of a digital driving by PWM (pulse width modulation), the PWM driving is performed respectively based on the B' signal in a blue light illuminating period 321, the G' signal in a green light illuminating period 322, the R' signal in a red light illuminating period 323 and the brightness signal W' in the overlapped light illuminating periods 324, 325 and 326, thereby achieving an appropriate color display.

Second Embodiment

Figure 6:
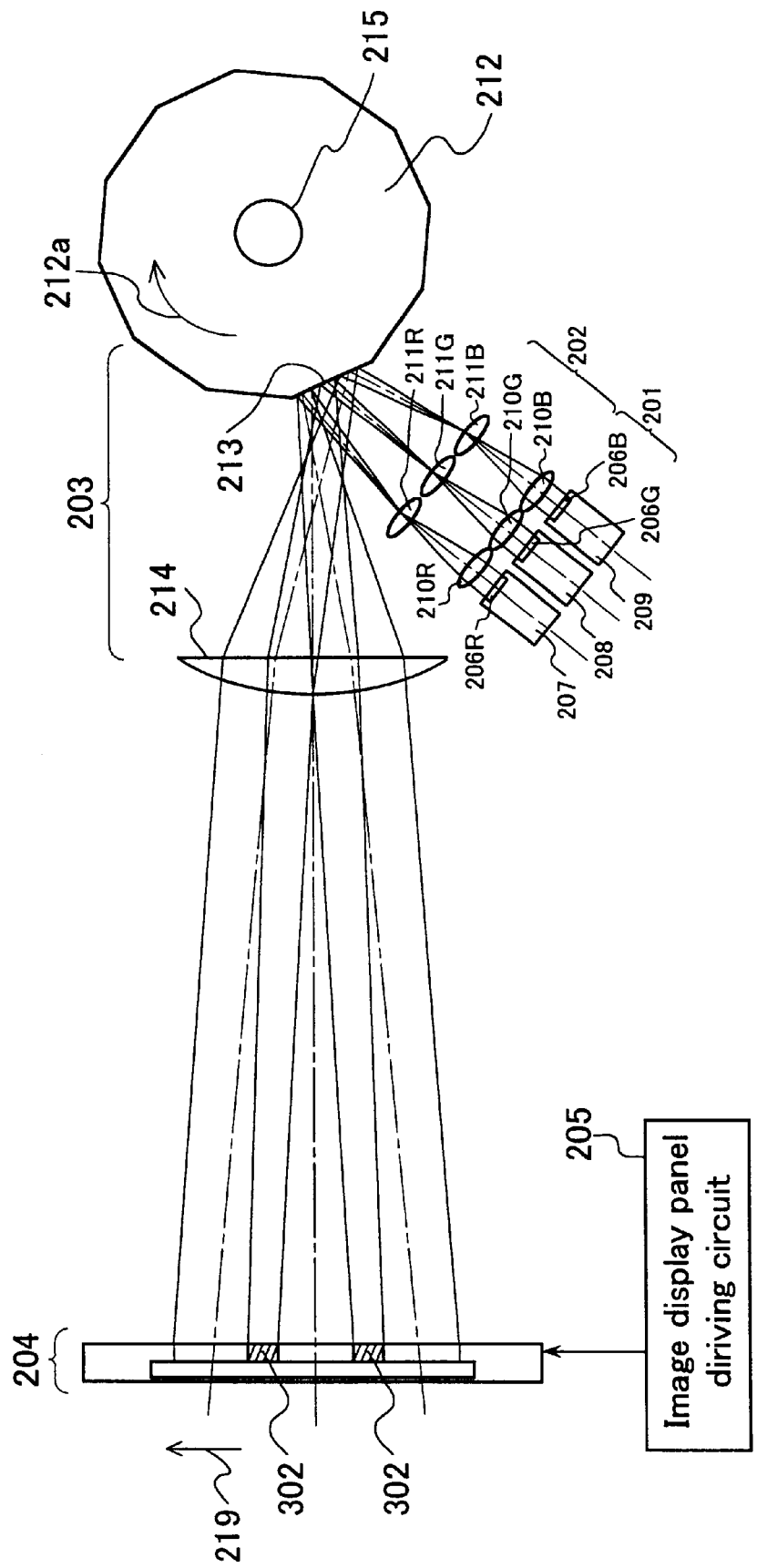
FIG. 6 is a view showing a configuration of a color image display device according to a second embodiment of the present invention.

FIG. 6 shows a schematic configuration of a color image display device according to the second embodiment of the present invention.

The color image display device of the present embodiment includes a light source portion 201, a focusing system (a first optical system) 202, a rotating polygon mirror 212, a scanning optical system (a second optical system) 203, an image display panel 204 and an image display panel driving circuit 205.

The light source portion 201 has a light source portion for red light 207, a light source portion for green light 208 and a light source portion for blue light 209 that emit red, green and blue light beams respectively. The light source portion for red light 207, the light source portion for green light 208 and the light source portion for blue light 209 respectively are provided with rectangular light emitting portions 206R, 206G and 206B on their light emitting side. Rectangular light beams of respective colors emitted from the light emitting portions 206R, 206G and 206B enter first focusing lenses 210R, 210G and 210B provided for the respective colors in the focusing system 202. The light beams of these colors leave the first focusing lenses 210R, 210G and 210B, pass through second focusing lenses 211R, 211G and 211B provided for the respective colors, and enter a reflecting surface 213 formed on a periphery of the rotating polygon mirror 212 at different angles from each other. These light beams reflected by the rotating polygon mirror 212 enter the scanning optical system 203 at different angles from each other, travel via a scanning lens 214 in the scanning optical system 203, and then reach the image display panel 204.

Figure 7:
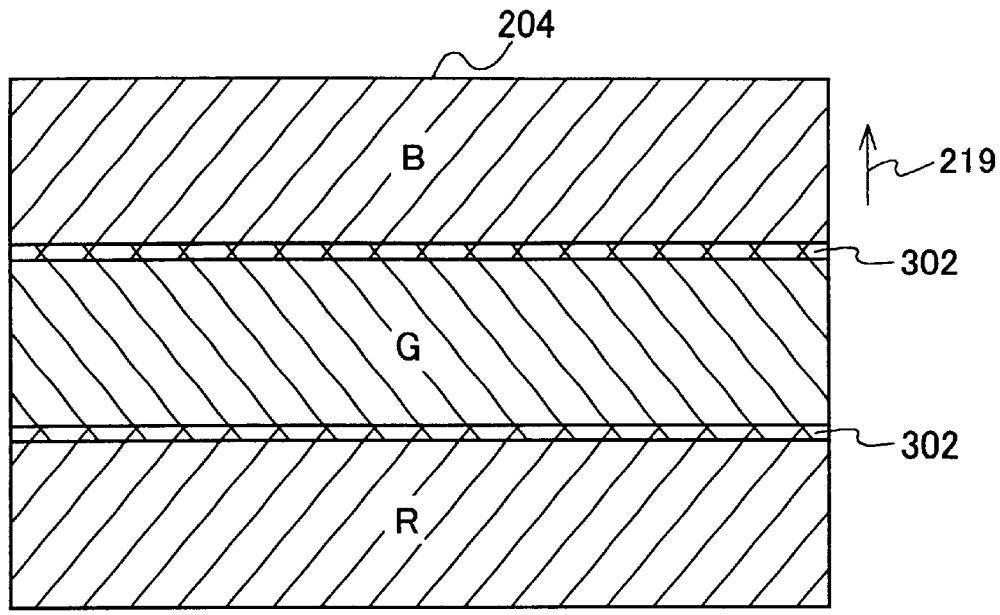
FIG. 7 is a front view schematically showing one example of illuminated regions formed on an image display panel of the color image display device according to the second embodiment of the present invention.

FIG. 7 shows an example of an illumination state of the image display panel 204 at an arbitrary moment. On an effective aperture region of the image display panel 204, belt-like regions illuminated by the light beams of the respective colors corresponding to the rectangular shape of the openings of the light emitting portions 206R, 206G and 206B are formed and arranged in a scanning direction 219. In FIG. 7, R represents a region illuminated by red light, G represents a region illuminated by green light and B represents a region illuminated by blue light. The adjacent illuminated regions overlap each other at their borders so as to form overlapping portions 302.

Figure 8:
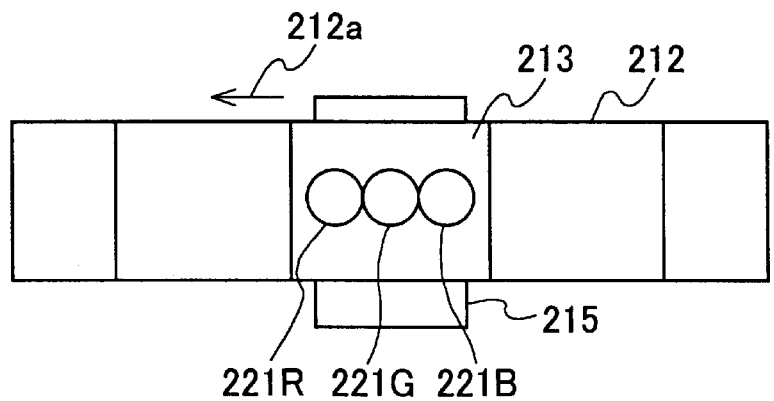
FIG. 8 is a front view showing focused spots formed on a rotating polygon mirror of the color image display device according to the second embodiment of the present invention.
Figure 9:
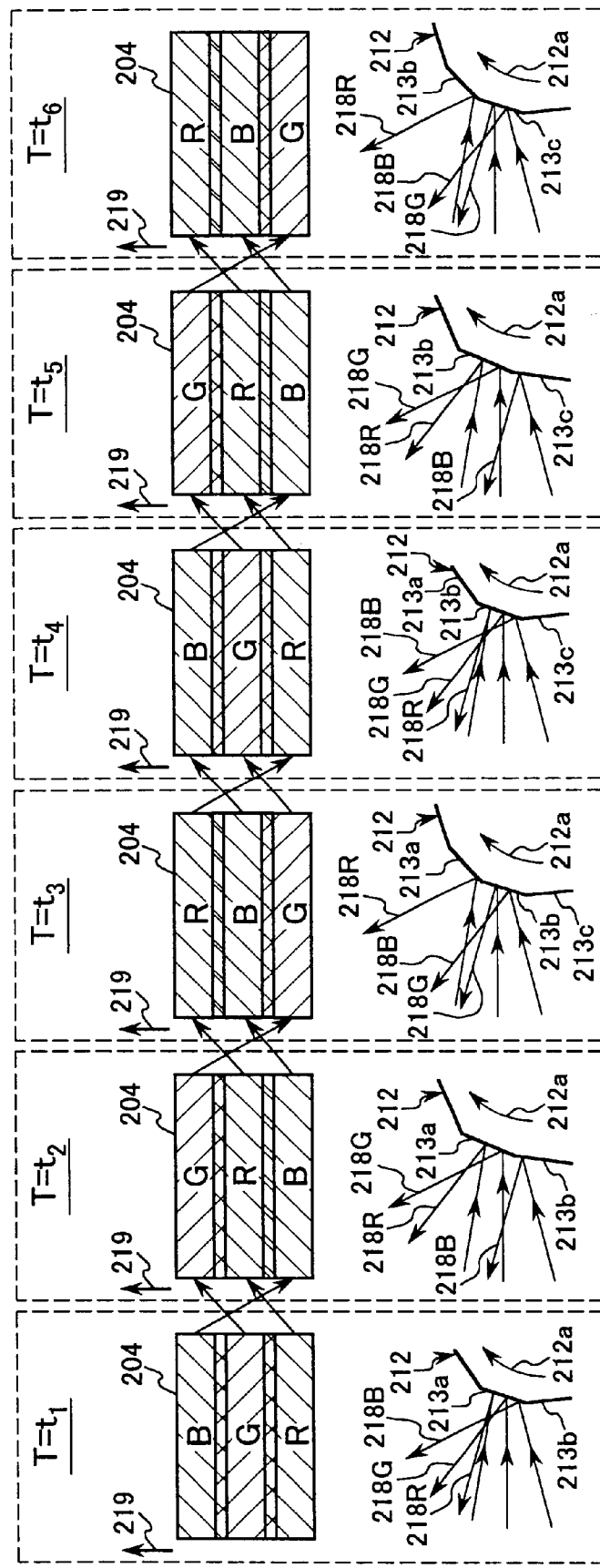
FIGS. 9A to 9F are drawings for describing a scanning principle of light beams of the individual colors in the color image display device according to the second embodiment of the present invention.

FIG. 8 shows one moment during the rotation of the rotating polygon mirror 212. As shown in this figure, groups (focused spots) of red, green and blue lights 221R, 221G and 221B are formed on one reflecting surface 213 so as to be substantially aligned along the rotation direction 212a such that their chief rays do not overlap each other.

The rotating polygon mirror 212 is rotated in the rotation direction 212a about a rotation axis 215 by a motor, which is not shown in this figure. The state of the emitted light beams affected by the rotation will be described by way of FIGS. 9A to 9F.

FIGS. 9A to 9F show the rotation of the rotating polygon mirror 212 and an accompanying change of the state of the image display panel 204 illuminated by the light beams of individual colors at a fixed time interval. In the figures showing the illumination states of the image display panel 204 located above, R, G and B represent regions illuminated by the red light, the green light and the blue light respectively as in FIG. 7. In the figures showing the rotation of the rotating polygon mirror 212 and reflection states of the light beams of individual colors located below, 218R, 218G and 218B indicate chief rays of red light, green light and blue light respectively, and arrows indicate the traveling directions of these rays.

At time T=t1 (see FIG. 9A), the light beams of red, green and blue enter the same reflecting surface 213a of the rotating polygon mirror 212. As shown in the figure, the blue light beam is reflected at the largest angle toward the direction in which the reflecting surface 213a moves (the rotation direction 212a), the green light beam is reflected at a slightly smaller angle than the blue light beam, and the red light beam is reflected at a still smaller angle than the green light beam. Thus, the light beams of these colors enter the scanning optical system 203 at different angles from each other. In the scanning optical system 203, a height of a light beam at an illumination position (the image display panel 204) is determined depending on the incident angle of the light beam. Therefore, the light beams of the respective colors form images of the light emitting portions 206R, 206G and 206B at different positions on the image display panel 204 as indicated by the figure. In other words, the region illuminated by the blue light, the region illuminated by the green light and the region illuminated by the red light are formed on the image display panel 204 in this order from the top.

At time T=t2 (see FIG. 9B), which is the time the rotating polygon mirror 212 has been rotated by a predetermined angle from the position at time T=t1, the red light beam and the green light beam enter the same reflecting surface 213a of the rotating polygon mirror 212, while the blue light beam enters a reflecting surface 213b that has just arrived at this entering position. At this time, in particular, since the incident angle of the blue light beam into the reflecting surface 213b is small, its reflection angle toward the rotation direction 212a is the smallest among the three light beams. Accordingly, the green light beam is reflected at the largest angle toward the rotation direction 212a, the red light beam is reflected at a slightly smaller angle than the green light beam, and the blue light beam is reflected at a still smaller angle than the red light beam. Therefore, the light beams of the respective colors enter the scanning optical system 203 at different angles from each other, and these light beams form images of the light emitting portions 206R, 206G and 206B at different positions on the image display panel 204 as indicated by the figure. In other words, the region illuminated by the green light, the region illuminated by the red light and the region illuminated by the blue light are formed on the image display panel 204 in this order from the top.

At time T=t3 (see FIG. 9C), which is the time the rotating polygon mirror 212 has been further rotated by a predetermined angle from the position at time T=t2, only the red light beam enters the reflecting surface 213a, while the green light beam and the blue light beam enter the same reflecting surface 213b. At this time, in particular, since the incident angle of the green light beam into the reflecting surface 213b is small, its reflection angle toward the rotation direction 212a is the smallest among the three light beams. Accordingly, the red light beam is reflected at the largest angle toward the rotation direction 212a, the blue light beam is reflected at a slightly smaller angle than the red light beam, and the green light beam is reflected at a still smaller angle than the blue light beam. Therefore, the light beams of the respective colors enter the scanning optical system 203 at different angles from each other, and these light beams form images of the light emitting portions 206R, 206G and 206B at different positions on the image display panel 204 as indicated by the figure. In other words, the region illuminated by the red light, the region illuminated by the blue light and the region illuminated by the green light are formed on the image display panel 204 in this order from the top.

At time T=t4 (see FIG. 9D), which is the time the rotating polygon mirror 212 has been further rotated by a predetermined angle from the position at time T=t3, the light beams of red, green and blue enter the same reflecting surface 213b. At this time, the positional relationship is the same as that at time T=t1 (see FIG. 9A), and the state of the image display panel 204 illuminated by the light beams of these colors also is the same.

At time T=t5 (see FIG. 9E), which is the time the rotating polygon mirror 212 has been further rotated by a predetermined angle, the red light beam and the green light beam enter the same reflecting surface 213b, while the blue light beam enters a reflecting surface 213c that has just arrived at this entering position. At this time, the positional relationship is the same as that at time T=t2 (see FIG. 9B), and the state of the image display panel 204 illuminated by the light beams of these colors also is the same.

At time T=t6 (see FIG. 9F), which is the time the rotating polygon mirror 212 has been further rotated by a predetermined angle, the red light beam enters the reflecting surface 213b, while the green light beam and the blue light beam enter the same reflecting surface 213c. At this time, the positional relationship is the same as that at time T=t3 (see FIG. 9C), and the state of the image display panel 204 illuminated by the light beams of these colors also is the same.

As described above, the belt-like regions illuminated by the red, green and blue light beams that are formed on the image display panel 204 move sequentially in the scanning direction 219. Although FIGS. 9A to 9F showed only the specific period (time T=t1 to t6) in the above description, because of a continuous rotation of the rotating polygon mirror 212, each of the regions illuminated by the light beams of the individual colors moves (is scanned) on the image display panel 204 continuously upward in the scanning direction 219. When the illuminated region reaches the upper end, it returns to the lower end and moves upward again.

The scanning optical system 203 is formed of an optical system provided with a function of a f lens (the function of forming an image at a position proportional to an incident angle of an incident light) and that of changing the magnification for illuminating an appropriate region on the image display panel 204.

As the image display panel 204, a known member, for example, a transmission-type liquid crystal light valve including a transmission-type liquid crystal display panel, an entrance-side polarizing plate as a polarizer provided on the entrance-side and an exit-side polarizing plate as an analyzer provided on the exit side can be used.

By using the image display panel driving circuit 205 while moving the regions illuminated by the light beams of the respective colors as above, each pixel on the image display panel 204 is driven by a video signal corresponding to the color of light illuminating this pixel. By scanning the light beams of the individual colors at a high speed, images of individual colors are synthesized so as to be perceived as a color image by a retina of an observer.

As described above, with the configuration in which the light beams of individual colors enter different positions of the rotating polygon mirror 212 at different incident angles, it is possible to display a color image even when using an image display panel that is not provided with a color selection member such as a color filter. In addition, since each pixel of the image display panel 204 displays the image of all the red, green and blue lights within one frame, the resolution is not deteriorated. Furthermore, since the light from the light source always is directed to the image display panel effectively, it is possible to achieve a high efficiency of light utilization.

Also, since the scanning is carried out using the rotating polygon mirror 212 and the light beams of the individual colors are focused on the reflecting surface 213, the reflecting surface 213 can be made smaller. Accordingly, it becomes possible to reduce not only the size of the rotating polygon mirror 212, but also that of a motor for rotating this rotating polygon mirror. As a result, it becomes possible to reduce the size, weight and cost of the entire device.

Furthermore, the overlapping portions 302 are formed in adjacent portions of the illuminated regions of red, green and blue light beams, making it possible to expand a focused area of each of these light beams on the image display panel 204. Consequently, as in the first embodiment, the f-number of a focusing optical system is reduced, achieving a smaller size and reducing the need for using a point light source.

The operation of the image display panel driving circuit 205 is the same as that in the first embodiment, and the description thereof is, therefore, omitted here. The overlapping portions 302 of the adjacent illuminating light beams are used for displaying a brightness component by using a video signal processing portion 301, so the efficiency of light utilization is not deteriorated. Also, any device can be used as the image display panel 204 as long as it is a display device that displays an image by modulating an incident light as in the first embodiment. Accordingly, either a transmission-type light valve or a reflection-type light valve can be used. In addition, its drive processing can be an analog driving or a digital driving by PWM. Needless to say, however, it has to be a device capable of fast response.

Third Embodiment

Figure 10:
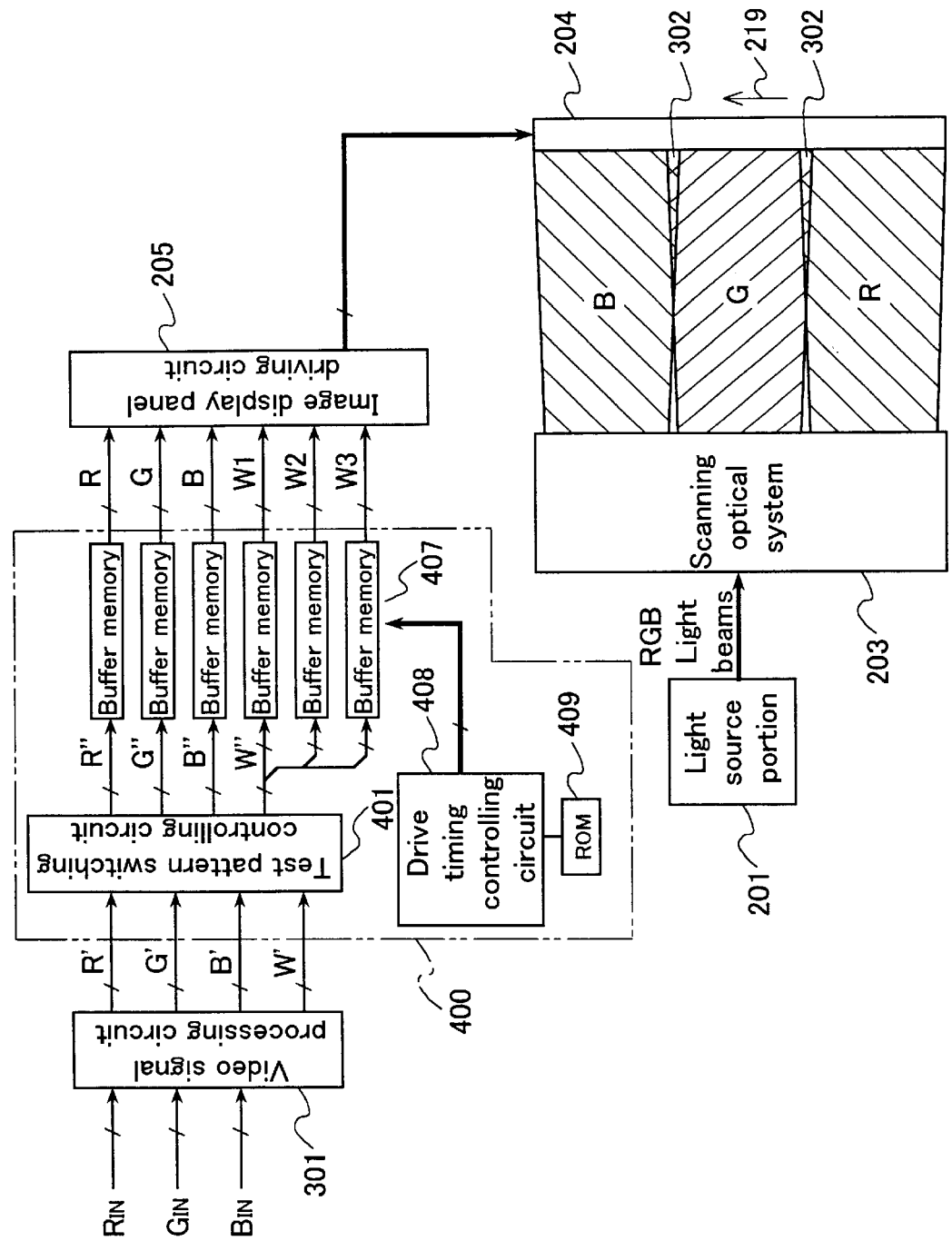
FIG. 10 is a view showing a configuration of a color image display device according to a third embodiment of the present invention.

FIG. 10 shows a configuration of a color image display device according the third embodiment of the present invention. The present embodiment has the configuration in which a drive timing adjusting circuit 400 is provided between the video signal processing circuit 301 and the image display panel driving circuit 205 in the configuration of the first embodiment (see FIG. 1). The drive timing adjusting circuit 400 includes a test pattern switching controlling circuit 401, buffer memories 407, a drive timing controlling circuit (a delay controlling circuit) 408 and a ROM 409 for storing an adjusted value.

Figure 11:
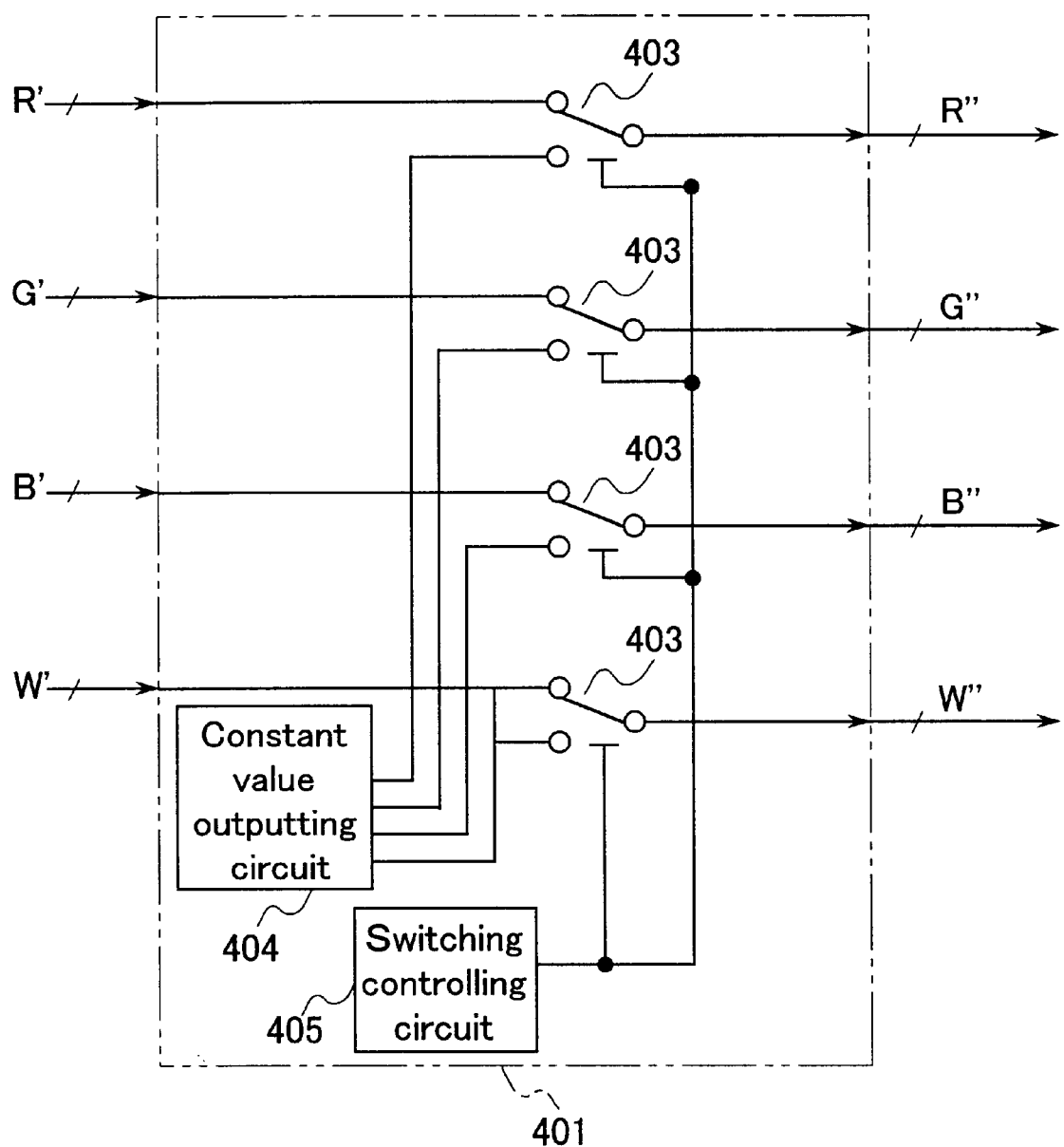
FIG. 11 is a block diagram showing a test pattern switching controlling circuit used in the color image display device of the third embodiment of the present invention.

As shown in FIG. 11, in the test pattern switching controlling circuit 401, switching circuits 403, each for switching a video signal (R', G', B' or a brightness component W') and a test pattern signal, are inserted on main lines along which the video signals travel. A constant-level signal outputted from a constant value outputting circuit 404 is sufficient for the test pattern signal, but needs to be capable of setting an arbitrary value independently to each of R, G and B signals and a brightness signal component W. The switching circuits 403 are switched by a switching controlling circuit 405.

In the subsequent stage of the test pattern switching controlling circuit 401, the buffer memories 407 are inserted.

The R, G and B signals and the brightness signal component W are retained temporarily in these buffer memories 407. The drive timing controlling circuit 408 is a regular memory controller for controlling memory write/read operations. The drive timing controlling circuit 408 can set an arbitrary delay time to each of the R, G and B signals and the brightness signal component W and read them out from the buffer memories 407 after a predetermined delay time. With respect to the brightness signal component W, the buffer memories 407 for three screens are provided and the delay times can be set individually to each of brightness signal components (W1, W2 and W3 in FIG. 10) that drive three different overlapping portions (Mg, Cy and Ye) between the regions illuminated by red, green and blue light beams. The delay times are stored in the ROM 409. The outputs of the buffer memories 407 are inputted to the image display panel driving circuit 205, whose output signal drives the image display panel 204.

Figure 12:
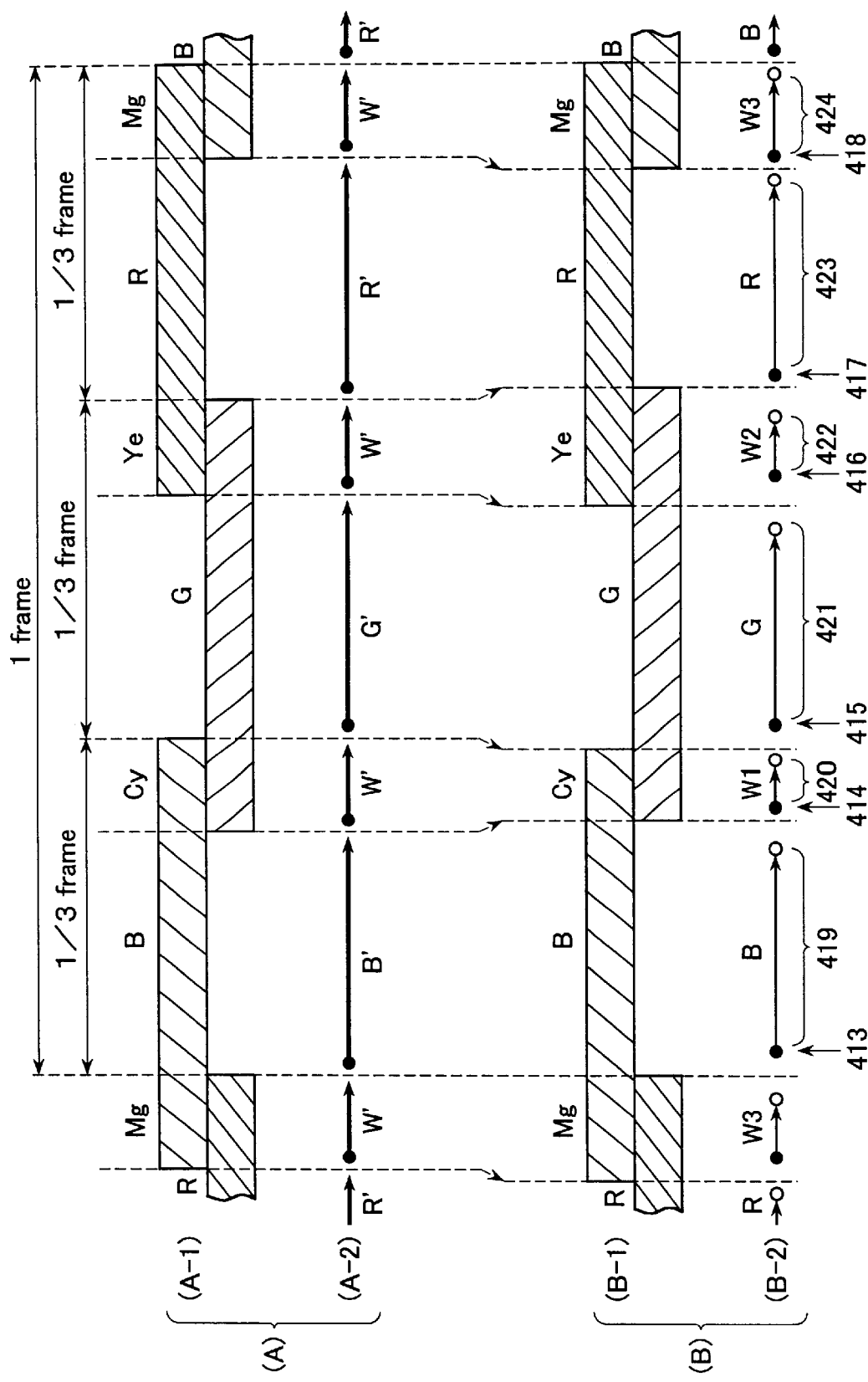
FIG. 12 is a timing chart showing relationships between illuminating light and a driving signal in the color image display device of the third embodiment of the present invention.

FIG. 12 is a drawing for describing the drive timing. As in FIG. 5, FIG. 12 shows relationships between the light illuminating an arbitrary pixel on the image display panel 204 and a driving signal to be inputted to this pixel. The transverse direction in FIG. 12 indicates a time base.

(A) in the upper part of FIG. 12 shows the drive timing of the first embodiment. Within a period corresponding to one frame, the light beam entering an arbitrary pixel is switched sequentially to B (blue), Cy (cyan: overlapping color of B (blue) and G (green)), G (green), Ye (yellow: overlapping color of G (green) and R (red)), R (red), and Mg (magenta: overlapping color of R (red) and B (blue)) (see (A-1) in FIG. 12). Accordingly, the driving signal inputted to this pixel is switched sequentially to a B' (blue) signal, a W' signal (a brightness signal), a G' (green) signal, the W' signal (the brightness signal), a R' (red) signal and the W' signal (the brightness signal) (see (A-2) in FIG. 12). In this case, the timing in which the driving signals are switched is fixed. When this timing and the timing in which the colors of the light beams illuminating the pixel are switched match, such driving control can obtain an excellent color image.

However, there is a case where, because of a structural error in the optical systems, phases of the scans of the illuminating light beams of R, G and B are shifted or the widths of the illuminated regions differ from each other in the scanning direction, thus changing the timing in which the colors of the light beams illuminating the pixel are switched as shown by (B-1) in the lower part (B) in FIG. 12. In such a case, if the pixel is driven in the switch timing of the driving signal indicated by (A-2), this causes a gap between the switch timing of the colors of the illuminating light beams and the switch timing of the driving signal. Thus, a white balance is lost, so that an excellent color image cannot be obtained.

According to the present embodiment, on the other hand, it is possible to set drive start timings by the signals of R, G, B and the brightness components (W1, W2 and W3) independently by the method described below. Therefore, the above mismatch of the timings can be corrected. (B) shown in the lower part of FIG. 12 indicates the drive timing that is subjected to a timing adjustment of the present embodiment. The timing adjustment of the present embodiment will be described by way of FIGS. 10 to 12.

When an arbitrary pixel of the image display panel 204 is illuminated according to the timing indicated by (B-1) in FIG. 12, the switching circuits 403 in the test pattern switching controlling circuit 401 are switched to a test pattern outputting mode. Next, test pattern signal levels outputted from the constant value outputting circuit 404 are set so that the B signal is largest and the other G signal, R signal and the brightness signal are at a non-display level. In this case, this pixel is driven only in a period 419 in (B-2) of FIG. 12, and blue should be displayed on the screen. However, when a drive start timing 413 and the switch timing of the colors of the illuminating lights do not match so that the driving period 419 extends into an illuminating period of a color portion mixed with the other color (Mg and Cy portions in (B-1) of FIG. 12), not a pure blue but a mixed color is displayed. In such a case, an operator adjusts the delay amount for the B signal in the buffer memory 407 so that the display on the screen achieves a pure blue. The adjusted value is stored in the ROM 409. With the above operation, the drive start timing 413 and the driving period 419 of the B signal are set to match with the illuminating period of the blue light in (B-1) of FIG. 12. The similar method is applied also to the G signal and the R signal, and the adjusted values are stored in the ROM 409.

The following is a description of one example of the method for adjusting the drive start timings of the brightness components W1, W2 and W3. The test pattern signal levels are set so that the brightness signal is largest and the R, G and B signals are at a non-display level. The output signals W1, W2 and W3 of the buffer memories 407 are inputted to the image display panel driving circuit 205, so that the panel 204 is driven. In this case, this pixel is driven only in periods 420, 422 and 424 in (B-2) of FIG. 12. If the driving periods 420, 422 and 424 by the brightness signals match with the illuminating periods of the mixed color portions, an integration effect should allow human eyes to see white displayed on the screen. However, when drive start timings 414, 416 and 418 of the brightness signals W1, W2 and W3 and the switch timing of the mixed colors of the illuminating light beams do not match so that the driving periods 420, 422 and 424 extend into illuminating periods of the R, G and B light beams, some color is displayed. In such a case, the operator adjusts a white balance using a calorimeter. More specifically, the delay amounts for the brightness signals W1, W2 and W3 in the buffer memories 407 are adjusted. The adjusted values are stored in the ROM 409. With the above operation, the drive start timings 414, 416 and 418 of the brightness signals W1, W2 and W3 and the driving periods 420, 422 and 424 are set to match with the illuminating periods of the light beams of the mixed colors (Mg, Cy and Ye) in (B-1) of FIG. 12.

In the above manner, the mismatch of the timing of the light illuminating the pixel and that of the driving signal driving this pixel can be corrected.

(B-2) of FIG. 12 indicates the drive timing when analog-driving the pixel. In the case of analog-driving, since the drive start timings 413 to 418 (the positions indicated by "●" in (B-2) of FIG. 12) and the drive end timings (the positions indicated by "○" in (B-2) of FIG. 12) have to be in accordance with the figure, a display element capable of high-speed driving and fast response is a prerequisite. On the other hand, in the case of PWM driving, by adjusting the drive start timings 413 to 418 (the positions indicated by "●" in (B-2) of FIG. 12), the driving periods (the periods 419 to 424 in (B-2) of FIG. 12) move along the sliding scale.

The above-described method for adjusting the drive timings is not limited to the configurations of FIGS. 10 to 12, but is effective in other configurations according to the effect of the present invention. For example, it can be used for an image display device in which the pixel is not driven by the brightness component, in other words, it is driven by the R, G and B signals alone as shown in (A) of FIG. 5 (including an image display device of a fifth embodiment described below).

Fourth Embodiment

Figure 13:
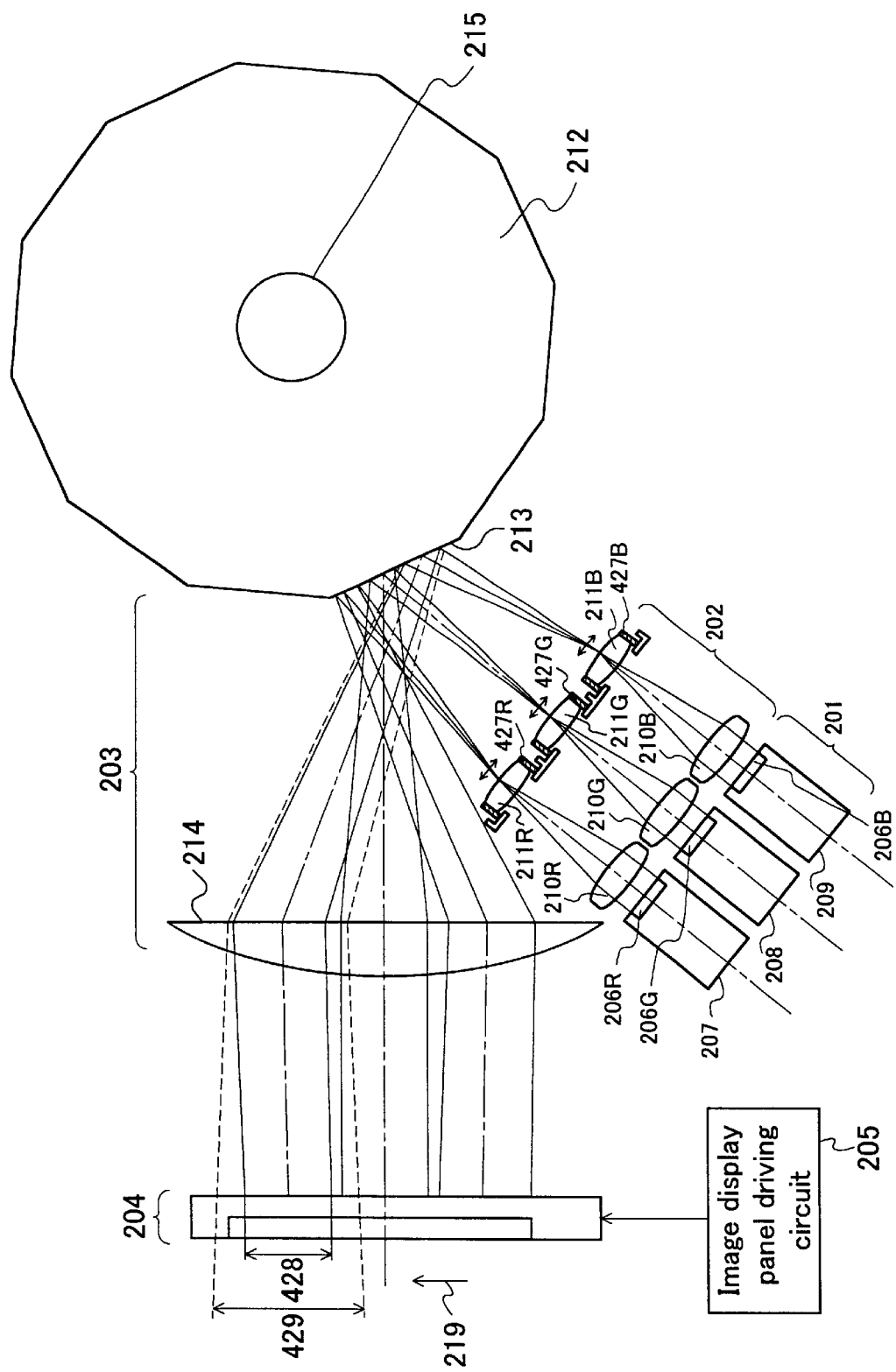
FIG. 13 is a view showing a configuration of a color image display device according to a fourth embodiment of the present invention.

FIG. 13 shows a schematic configuration of a color image display device according to the fourth embodiment of the present invention.

The color image display device of the present embodiment includes a light source portion 201, a focusing system (a first optical system) 202, a scanning optical system (a second optical system) 203, an image display panel 204 and an image display panel driving circuit 205.

The light source portion 201 has a light source portion for red light 207, a light source portion for green light 208 and a light source portion for blue light 209 that emit red, green and blue light beams respectively. The light source portion for red light 207, the light source portion for green light 208 and the light source portion for blue light 209 respectively are provided with rectangular light emitting portions 206R, 206G and 206B on their light emitting side. Rectangular light beams of respective colors emitted from the light emitting portions 206R, 206G and 206B enter first focusing lenses 210R, 210G and 210B provided for the respective colors in the focusing system 202. The light beams of these colors leave the first focusing lenses 210R, 210G and 210B, pass through second focusing lenses 211R, 211G and 211B provided for the respective colors, and enter a reflecting surface 213 formed on a periphery of a rotating polygon mirror 212 at different angles from each other. These light beams reflected by the rotating polygon mirror 212 enter the scanning optical system 203 at different angles from each other, travel via a scanning lens 214 in the scanning optical system 203, and then reach the image display panel 204.

As shown in FIG. 13, the second focusing lenses 211R, 211G and 211B of the focusing system 202 respectively are supported by lens position adjusting mechanisms 427R, 427G and 427B that can move the second focusing lenses 211R, 211G and 211B in a direction perpendicular to their optical axes. When the second focusing lenses 211R, 211G and 211B move in the direction perpendicular to their optical axes, an incident angle of the light beams entering the reflecting surface 213 of the rotating polygon mirror 212 changes. In other words, the focusing system 202 can change the incident angle of the light beam. For example, when the incident angle of a blue light beam, which is emitted from the second focusing lens 211B, into the reflecting surface 213 of the rotating polygon mirror 212 is changed by the adjusting mechanism 427B, the incident angle of the light beam entering the scanning optical system 203 also changes. Thus, a region illuminated by the blue light beam 428 on the image display panel 204 moves to an arbitrary position within a movable range 429. Similarly, regions illuminated by green and red light beams on the image display panel 204 also can be moved vertically by the adjusting mechanisms 427G and 427R. As described above, in the color image display device of the present embodiment, the regions illuminated by the blue, green and red light beams on the image display panel 204 can be adjusted independently in a scanning direction 219.

As described in the third embodiment, there is a case where a structural error in the optical systems causes a gap between the switch timing of the colors of the light beams illuminating a pixel and the switch timing of the driving signal inputted to this pixel. In such a case, a white balance is lost, so that an excellent color image cannot be obtained. The color image display device of the present embodiment, on the other hand, corrects this gap of the timings using the above-described adjusting mechanisms 427R, 427G and 427B.

Figure 14:
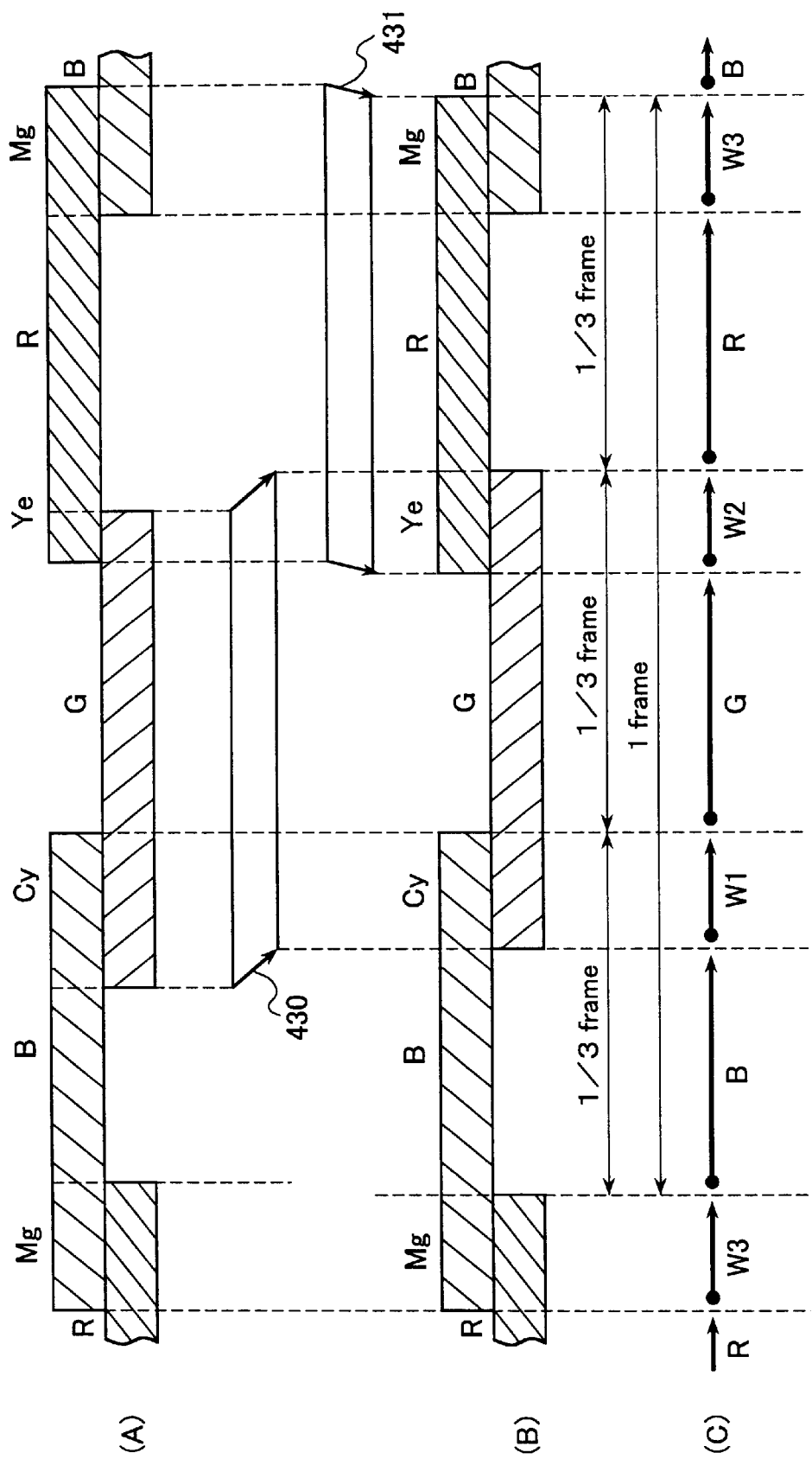
FIG. 14 is a timing chart showing relationships between illuminating light and a driving signal in the color image display device of the fourth embodiment of the present invention.

The following is a description of this adjusting method with reference to FIG. 14. As in FIG. 5, FIG. 14 shows relationships between the light illuminating an arbitrary pixel on the image display panel 204 and a driving signal to be inputted to this pixel. The transverse direction in FIG. 14 indicates a time base.

(C) in FIG. 14 indicates the driving signal to be inputted to the arbitrary pixel. The driving signal is switched sequentially to a B (blue) signal, a W1 signal (a brightness signal), a G (green) signal, a W2 signal (a brightness signal), a R (red) signal and a W3 signal (a brightness signal). Those switch timings of the driving signal are fixed.

(A) in FIG. 14 shows a pre-adjustment switch timing of the light beam illuminating this pixel. In other words, the light beam entering this pixel is switched sequentially to B (blue), Cy (cyan: overlapping color of B (blue) and G (green)), G (green), Ye (yellow: overlapping color of G (green) and R (red)), R (red), and Mg (magenta: overlapping color of R (red) and B (blue)). Because of a manufacturing error or the like of the optical systems, the switch timing of the illuminating light beam is shifted from an original switch timing as shown by (A) in FIG. 14. In other words, when it comes to the regions illuminated by the light beams of the individual colors on the image display panel 204, the regions illuminated by the green (G) light beam and the red (R) light beam come closer to the region illuminated by the blue (B) light beam. Consequently, the illuminated regions of cyan (Cy: overlapping color of B (blue) and G (green)) and magenta (Mg: overlapping color of R (red) and B (blue)) are wide, while the illuminated region of yellow (Ye: overlapping color of G (green) and R (red)) is narrow. Therefore, the switch timing of the illuminating light beams of (A) in FIG. 14 and the switch timing of the driving signal of (C) in FIG. 14 do not match. Thus, a white balance is lost, so that an excellent color image cannot be obtained.

In this case, the white balance is adjusted as follows. First, the switching circuits 403 in the test pattern switching controlling circuit 401 shown in FIG. 11 are switched to a test pattern outputting mode. Next, test pattern signal levels are set so that the brightness signal is largest and the R signal, G signal and B signal are at a non-display level. In this case, the image display panel 204 is driven only by brightness signals W1, W2 and W3. Now, by operating the adjusting mechanisms 427R, 427G and 427B sequentially, the white balance is adjusted with a colorimeter. In the example of (A) in FIG. 14, by using the adjusting mechanisms 427G and 427R, the region illuminated by the green (G) light beam and that illuminated by the red (R) light beam are moved relatively with respect to the region illuminated by the blue (B) light beam as shown in arrows 430 and 431 in FIG. 14. (B) of FIG. 14 shows a post-adjustment switch timing of the light beam illuminating the above-mentioned pixel. The switch timing of the illuminating light beams of (B) in FIG. 14 and the switch timing of the driving signal of (C) in FIG. 14 match, so that an excellent color image can be obtained.

As described above, the third and fourth embodiments are the same in that the gap between the switch timing of the illuminating light beam and that of the driving signal is adjusted. However, they are different in that the adjustment is made by moving the drive start timings of the R, G and B signals and the brightness signal component along the sliding scale in the circuit in the third embodiment, whereas the adjustment is made by changing the positions of the second focusing lenses 211R, 211G and 211B structurally so as to shift the illuminated regions on the image display panel 204 in the fourth embodiment.

Although FIG. 14 has described an exemplary case of the image display device that drives a pixel by the R, G and B signals and the brightness signal component, the adjusting method of the fourth embodiment using the adjusting mechanisms 427R, 427G and 427B is not limited to the above case. For example, in the image display device in which the pixel is not driven by the brightness signal component, in other words, it is driven by the R, G and B signals alone as shown in (A) of FIG. 5 (including an image display device of a fifth embodiment described below), the above adjusting method also can be used as the one for eliminating the overlapping portion of the illuminating light beams of R, G and B.

A display device (a light valve) used in the above-described color image display device of the present invention may be either a transmission-type or a reflection-type, and its driving system may be either an analog driving or a digital driving.

Fifth Embodiment

Figure 15:
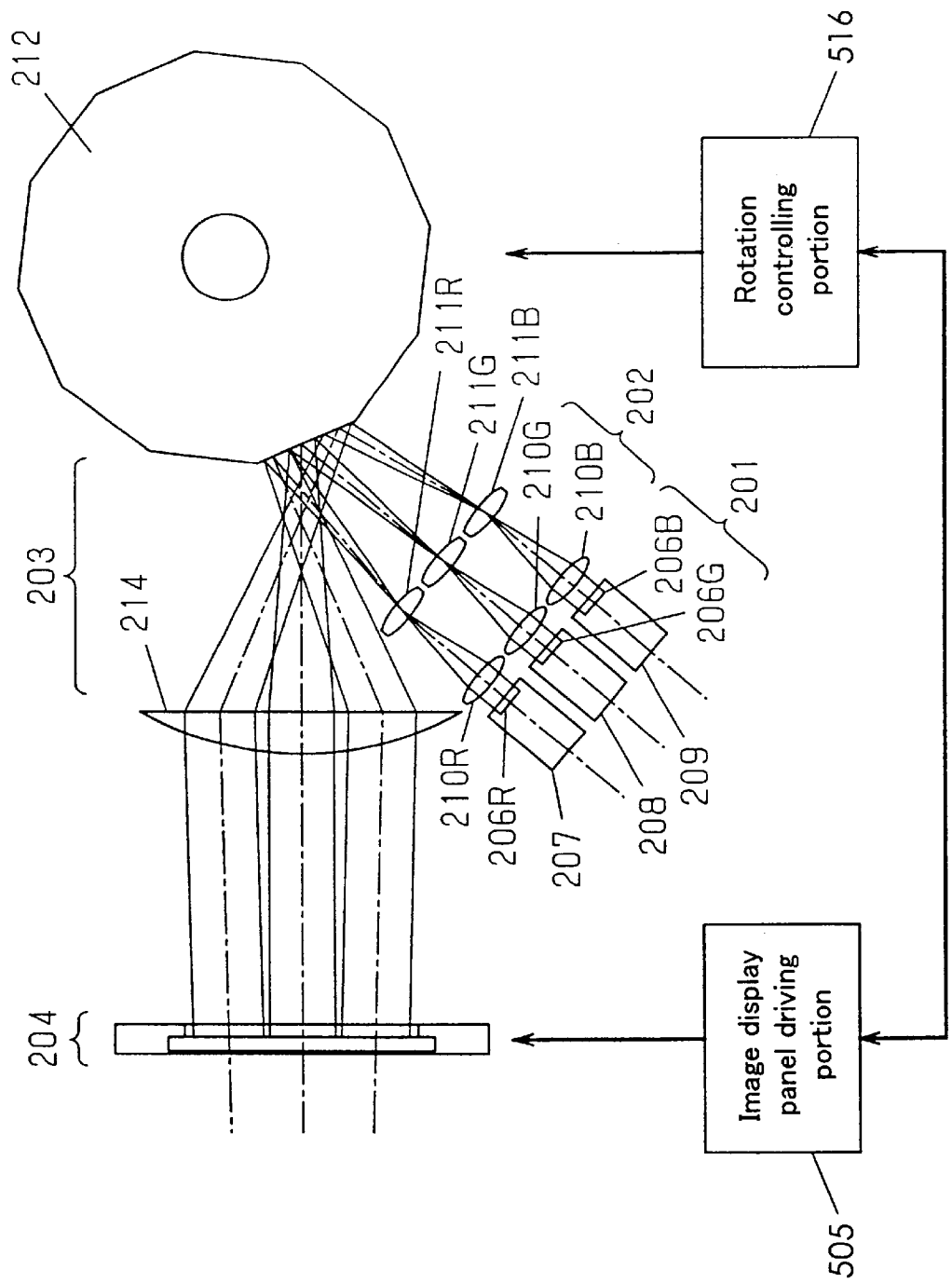
FIG. 15 is a view showing a configuration of a color image display device according to a fifth embodiment of the present invention.

FIG. 15 shows a schematic configuration of a color image display device according to the fifth embodiment of the present invention.

In FIG. 15, numeral 201 denotes a light source portion, numeral 202 denotes a focusing optical system as a first optical system, numeral 203 denotes a scanning optical system as a second optical system, numeral 204 denotes an image display panel, numeral 212 denotes a rotating polygon mirror as an optical path turning device, numeral 505 denotes an image display panel driving portion (an image display panel driving circuit), and numeral 516 denotes a rotation controlling portion constituted by a motor for rotating the rotating polygon mirror 212 and a rotation controlling circuit.

The following is a description of an operation of the color image display device of the fifth embodiment with reference to FIG. 15.

The light source portion 201 has a light source portion for red light 207, a light source portion for green light 208 and a light source portion for blue light 209 that emit red, green and blue light beams respectively. The light source portion for red light 207, the light source portion for green light 208 and the light source portion for blue light 209 respectively are provided with rectangular light emitting portions 206R, 206G and 206B on their light emitting side. Rectangular light beams of respective colors emitted from the light emitting portions 206R, 206G and 206B enter first focusing lenses 210R, 210G and 210B provided for the respective colors in the focusing system 202. The light beams of these colors leave the first focusing lenses 210R, 210G and 210B, pass through second focusing lenses 211R, 211G and 211B provided for the respective colors, and enter a reflecting surface 213 formed on a periphery of the rotating polygon mirror 212 at different angles from each other. These light beams reflected by the rotating polygon mirror 212 enter the scanning optical system 203 at different angles from each other, travel via a scanning lens 214 in the scanning optical system 203, and then reach the image display panel 204. The light beams of the respective colors enter different positions on the image display panel 204 by the focusing optical system 202 and the scanning optical system 203, so that rectangular (belt-like) regions illuminated by these light beams are formed at the different positions on the image display panel.

The rotating polygon mirror 212 as the optical path turning device is rotated by the rotation controlling portion 516. According to the rotation of the rotating polygon mirror 212, the regions illuminated by the red, green and blue light beams move sequentially on the image display panel 204. The rotation of the rotating polygon mirror 212 is controlled so as to synchronize with a video signal by the rotation controlling portion 516. In other words, each pixel on the image display panel 204 is driven by the video signal of a color corresponding to the color of the light entering this pixel in synchronization with the color change of the incident light.

Figure 16:
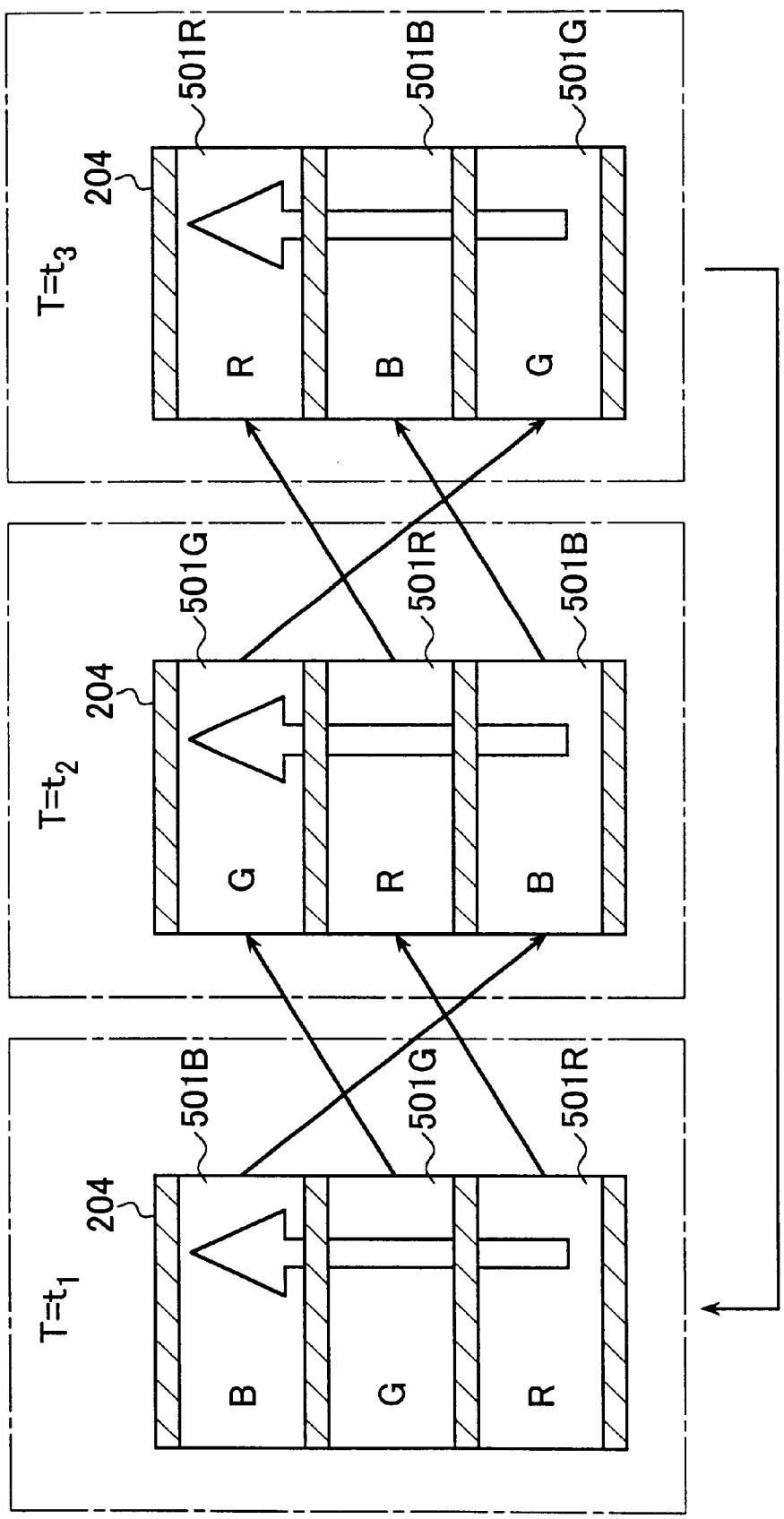
FIG. 16 is a drawing for describing how regions illuminated by light beams of individual colors scan (move) on an image display panel in the color image display device according to the fifth embodiment of the present invention.

FIG. 16 is a drawing for describing an illumination state of the red, green and blue light beams of primary colors on the image display panel 204.

As shown in FIG. 16, at time T=t1, belt-like regions 501B, 501G and 501R illuminated respectively by the light beams of blue (B), green (G) and red (R) are formed on the image display panel 204 in this order from the top. At time T=t2, which is the time after a predetermined period from time T=t1, the rotating polygon mirror 212 has been rotated slightly. Accordingly, the illuminated regions of the respective colors move upward sequentially, and the region illuminated by the blue light that has reached the upper end returns to the lower end, so that the belt-like regions 501G, 501R and 501B illuminated respectively by the green, red and blue light beams are formed on the image display panel 204 in this order from the top. Furthermore, at time T=t3, which is the time after a predetermined period since time T=t2, the rotating polygon mirror 212 further has been rotated slightly, so that belt-like regions 501R, 501B and 501G illuminated respectively by the red, blue and green light beams are formed on the image display panel 204 in this order from the top. Then, after another predetermined period, the illumination state returns to that of the time T=t1 described above.

As described above, while the regions illuminated by the blue, green and red light beams are moved sequentially on the image display panel 204 by rotating the rotating polygon mirror 212, it is possible to illuminate the image display panel 204.

Although the regions illuminated by adjacent light beams are separated clearly without overlapping each other in FIG. 16, they sometimes overlap in their border in practice for the purpose of allowing an accuracy error of the component parts or variation during assembly of them. Alternatively, as described in the second embodiment, there is a case where the adjacent illuminated regions are overlapped intentionally in order to reduce the f-number of the focusing optical system to achieve a smaller size.

Figure 17B:
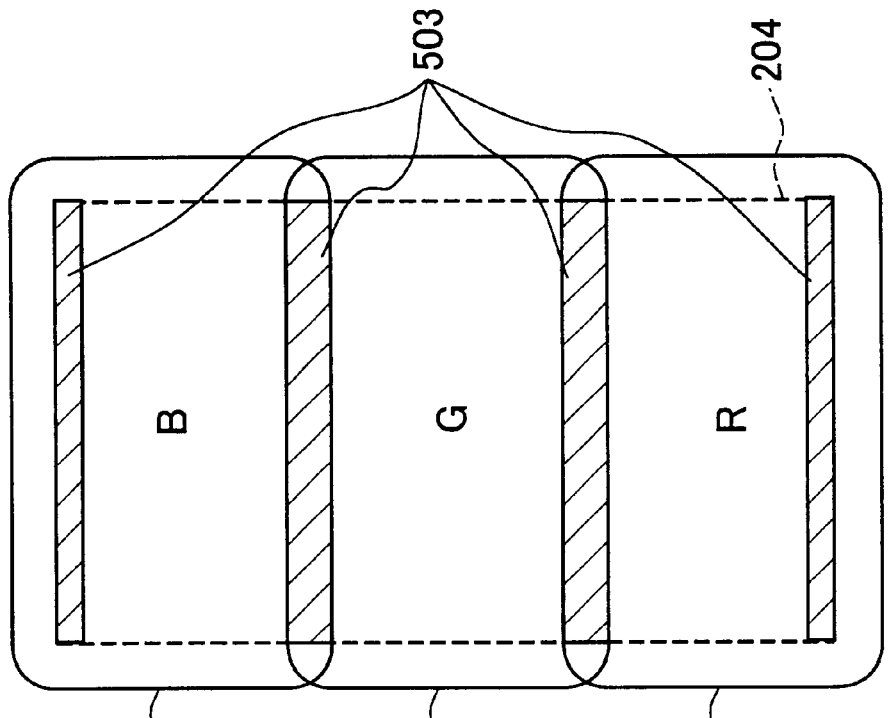
FIG. 17B is a drawing showing how black display belts are formed on a border of the adjacent illuminated regions on the image display panel.
Figure 17A:
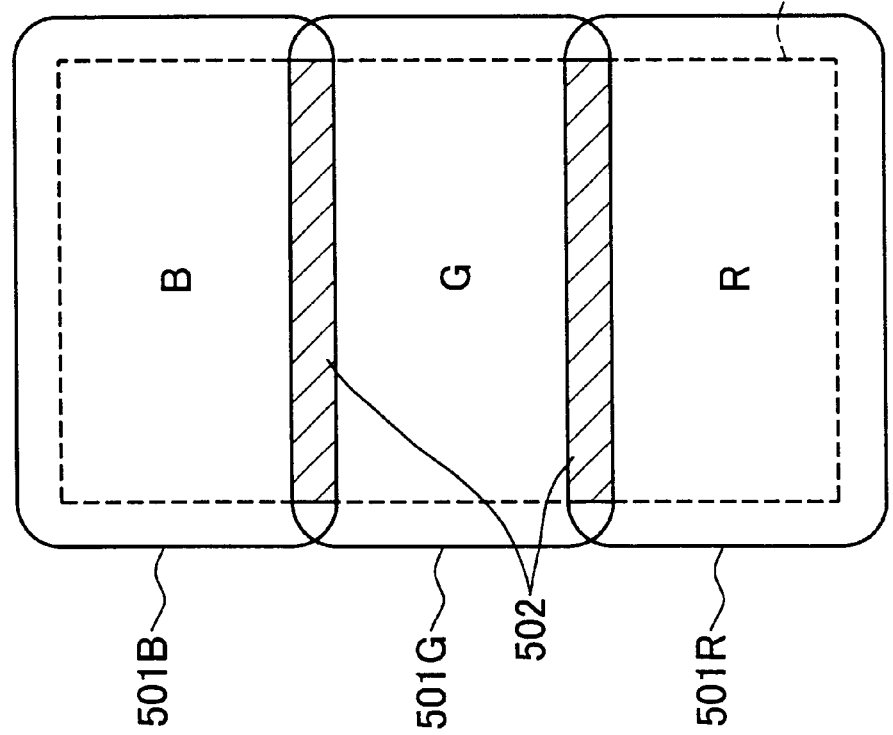
FIG. 17A is a drawing showing how adjacent illuminated regions on the image display panel overlap each other in the color image display device according to the fifth embodiment of the present invention.

FIGS. 17A and 17B are drawings for describing an actual illumination state on the image display panel 204 and an effect of the present invention.

FIG. 17A shows how the regions illuminated by adjacent light beams overlap each other. When overlapping portions 502 are generated in the illuminated regions as shown in this figure, two colors of the light beams are mixed in this overlapping portion so as to display an image with a color different from the intended color. This lowers color reproducibility. In order to solve such a problem, in the fifth embodiment, an image in the overlapping portion of illuminated regions of the adjacent light beams on the image display panel 204 is displayed as black. In other words, as shown in FIG. 17B, black display belts 503 are formed in the borders of the adjacent illuminated regions on the image display panel 204, thereby avoiding the effect of the color mixture owing to the overlap of the light beams of different colors. In this manner, the deterioration of the color reproducibility can be prevented.

Figure 18:
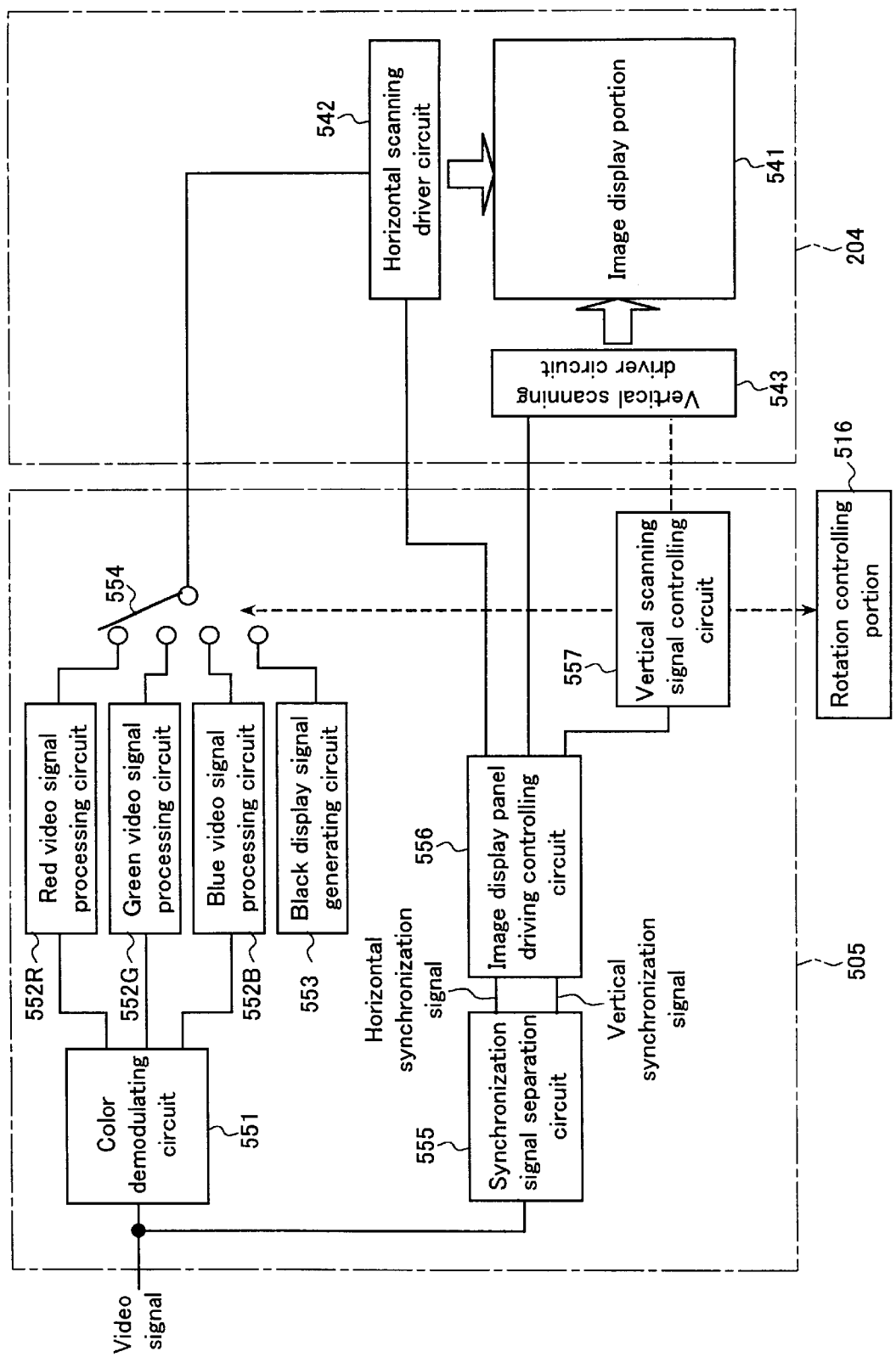
FIG. 18 is a block diagram showing a configuration of the image display panel and an image display panel driving portion of the color image display device according to the fifth embodiment of the present invention.

FIG. 18 is a block diagram showing a configuration of the image display panel 204 and the image display panel driving portion 505.

In FIG. 18, numeral 541 denotes an image display portion for displaying an image in the image display panel 204, numeral 542 denotes a horizontal scanning driver circuit for performing a horizontal scanning to display the image on the image display portion 541, and numeral 543 denotes a vertical scanning driver circuit for generating a scanning signal for performing a vertical scanning to display the image on the image display panel. The image display panel 204 is not provided with an absorption-type color selection member such as a color filter in the image display portion 541, so it is a light valve without a pixel exclusively for each color.

Numeral 551 denotes a color demodulating circuit for separating a video signal into signals of primary colors of red, green and blue. Numeral 552R denotes a red video signal processing circuit for processing the red video signal from the color demodulating circuit 551 into a signal capable of being displayed on the image display panel 204, numeral 552G denotes a green video signal processing circuit for processing the green video signal from the color demodulating circuit 551 similarly, numeral 552B denotes a blue video signal processing circuit for processing the blue video signal from the color modulating circuit 551 similarly, and numeral 553 denotes a black display signal generating circuit for generating a video signal of the black display portion. Numeral 554 denotes a video signal switching circuit for switching output signals from the video signal processing circuits 552R, 552G and 552B and the black display signal generating circuit 553 so as to select a signal to be inputted to the horizontal scanning driver circuit 542. Numeral 555 denotes a synchronization signal separation circuit for separating the video signal into a horizontal synchronization signal and a vertical synchronization signal, and numeral 556 denotes an image display panel driving controlling circuit for generating a control signal necessary for displaying an image on the image display panel 204 from the inputted synchronization signal. Numeral 557 denotes a vertical scanning signal controlling circuit for generating a switching control signal to the video signal switching circuit 554 and a control signal to the rotation controlling portion 516 based on the control signal from the image display panel driving controlling circuit 556.

Figure 19:
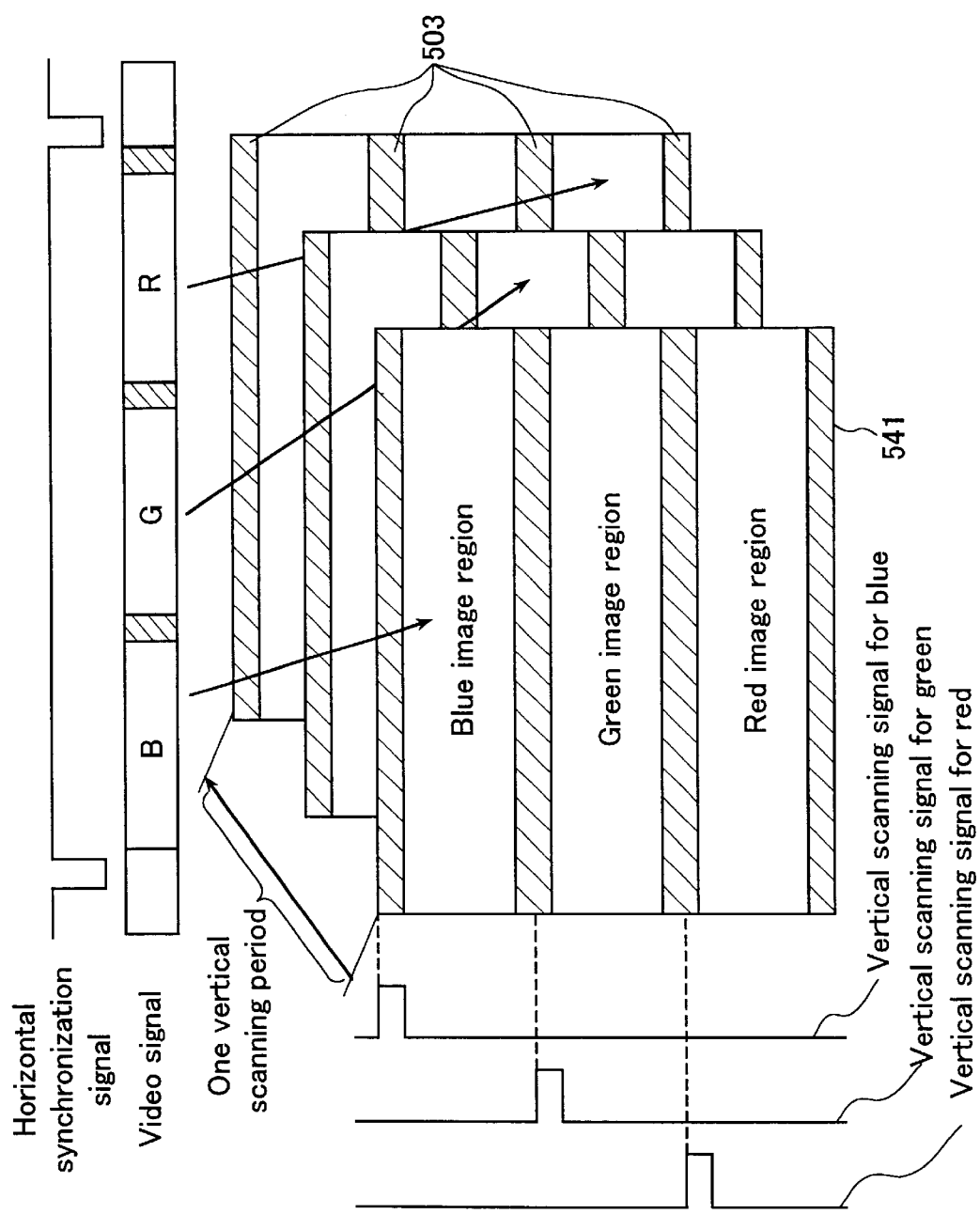
FIG. 19 is a timing chart for describing a method for driving the image display panel of the color image display device according to the fifth embodiment of the present invention.

FIG. 19 is a timing chart for describing an operation of vertical scanning by the image display panel driving portion 505.

The following is a description of the operation of the image display panel driving portion 505 with reference to FIGS. 18 and 19.

As shown in FIG. 19, three channels of vertical scanning signals for blue, green and red are outputted from the vertical scanning driver circuit 543. The vertical scanning signals are outputted so as to individually select display pixel portions that are shifted by ⅓ from each other in the vertical scanning direction of the image display portion 541. For example, in the case where the number of display lines in the vertical direction of the image display portion 541 is 480, when the vertical scanning signal for blue is outputted to the first scanning signal line of the image display portion 541, the vertical scanning signal for green is outputted to the 161st scanning signal line and the vertical scanning signal for red is outputted to the 321st scanning signal line. Every time one horizontal scanning period of the video signal ends, the vertical scanning driver circuit 543 outputs the scanning signals so as to respectively select the subsequent scanning signal lines.

The horizontal scanning is performed such that one horizontal scanning period is divided timewise into three periods, and each of the video signals for red, green and blue is outputted to the video signal line within each of the periods.

After the video signal is separated into the signals of the primary colors in the color demodulating circuit 551, these signals are processed to be signal forms that can display an image on the image display panel 204 in the corresponding video signal processing circuits 552R, 552G and 552B. The video signal processing circuits 552R, 552G and 552B conduct signal processing in a speed over three times as fast as a normal speed in order to write the red, green and blue video signals into the image display panel within one horizontal scanning period, and then output the processed video signals by time division. The video signal switching circuit 554 is controlled by the switching control signal from the vertical scanning signal controlling circuit 557, so as to switch the video signals to be inputted to the horizontal scanning driver circuit 542 by time division. The horizontal scanning driver circuit 542 performs scanning in a speed over three times as fast as a normal speed in order to finish scanning the video signals of the individual colors within ⅓ of one horizontal scanning period.

Also, the vertical scanning signals for the individual colors outputted from the vertical scanning driver circuit 543 are controlled by the vertical scanning signal controlling circuit 557 so as to synchronize with the video signal of the respective colors outputted from the horizontal scanning driver circuit 542. In other words, while the blue video signal is being outputted from the horizontal scanning driver circuit 542, the vertical scanning signals are controlled so that only the vertical scanning signal for blue is valid and the vertical scanning signals for the other colors are invalid. Next, while the green video signal is being outputted from the horizontal scanning driver circuit 542, only the vertical scanning signal for green is valid. Then, while the red video signal is being outputted, only the vertical scanning signal for red is valid. The red, green and blue video signals are outputted sequentially from the horizontal scanning driver circuit 542 within one horizontal scanning period, and by controlling the vertical scanning signals as above, it is possible to display an image of a predetermined color at a predetermined position of the image display portion 541.

When sequentially switching the video signals from the video signal processing circuits 552R, 552G and 552B based on the switching control signal from the vertical scanning signal controlling circuit 557, the video signal switching circuit 554 switches the video signals for a certain period to the video signal from the black display signal generating circuit 553. The vertical scanning signal controlling circuit 557 controls the video signal switching circuit 554, the vertical scanning driver circuit 543 and the rotation controlling portion 516 so as to synchronize the rotation of the rotating polygon mirror 212 and the scanning of the video signal. Accordingly, it is possible to match the overlapping portion of the individual colors of light beams and the black display portion 503.

The above description is directed to a case where images of the respective colors to be displayed on the image display panel 204 are divided vertically. However, the images can be divided horizontally by setting a scanning speed of the horizontal scanning driver circuit 542 to be normal, switching the video signals by time division in the video signal switching circuit 554, and using one channel of the vertical scanning signal.

As described above, in the color image display device of the present embodiment, the red, green and blue light beams are irradiated simultaneously in a belt-like manner and scan on the image display panel 204 by the focusing optical system 202, the scanning optical system 203 and the rotating polygon mirror 212. Meanwhile, the video signals of the primary colors are inputted in the horizontal scanning driver circuit 542 by time division so as to perform the horizontal scanning, and the vertical scanning signals for the individual colors are driven by the vertical scanning signal controlling circuit 557 in synchronization with the colors of the video signals being outputted from the horizontal scanning driver circuit 542. In this way, the red, green and blue images can be displayed at the same time in such a manner as to have divided display regions for these color images on the single image display panel 204. Thus, the light from the light source is utilized more effectively, and a bright display screen can be achieved using the single image display panel. Furthermore, the images of the overlapping portion of the light beams illuminating the image display panel are displayed as black, thereby preventing the color of the displayed image from becoming abnormal owing to the color mixture of the illuminating light beams. Consequently, it is possible to achieve a color image display device having excellent color reproducibility.

In the present embodiment, when the adjacent illuminated regions on the image display panel are overlapped intentionally, such overlapping portions are displayed as black. However, the present invention is not limited to the above example. In other words, even when the adjacent illuminated regions on the image display panel are designed not to overlap each other, predetermined regions on the adjacent sides of the illuminated regions may be displayed as black. Even when the adjacent illuminated regions are designed as such, there is a case where two different colors of light unintentionally enter the same pixel simultaneously because of a blurring of light in the border of the illuminated regions, a manufacturing error or an assembly error. In such a case, by providing the black display belt, it is possible to prevent the deterioration of the color reproducibility. This can expand a range of an allowable error of component parts constituting the optical system and assembling accuracy, making it possible to achieve a low-cost device.

Although the transmission-type light valve has been used as the image display panel 204 as an example in the present embodiment, it should be clear that a reflection-type light valve may be used.

Sixth Embodiment

Figure 20:
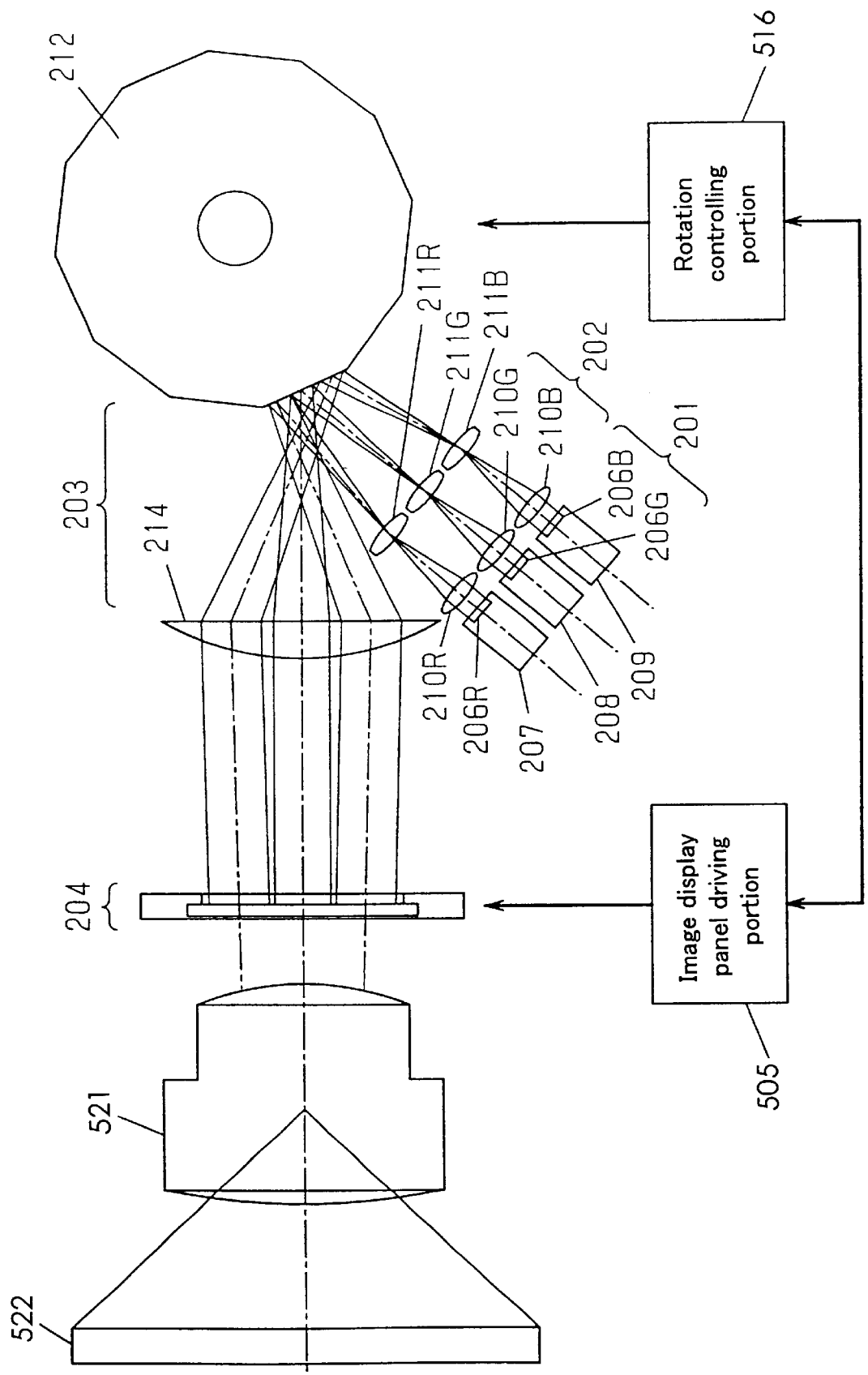
FIG. 20 is a view showing a configuration of a projection-type image display apparatus according to a sixth embodiment of the present invention.
Figure 21:
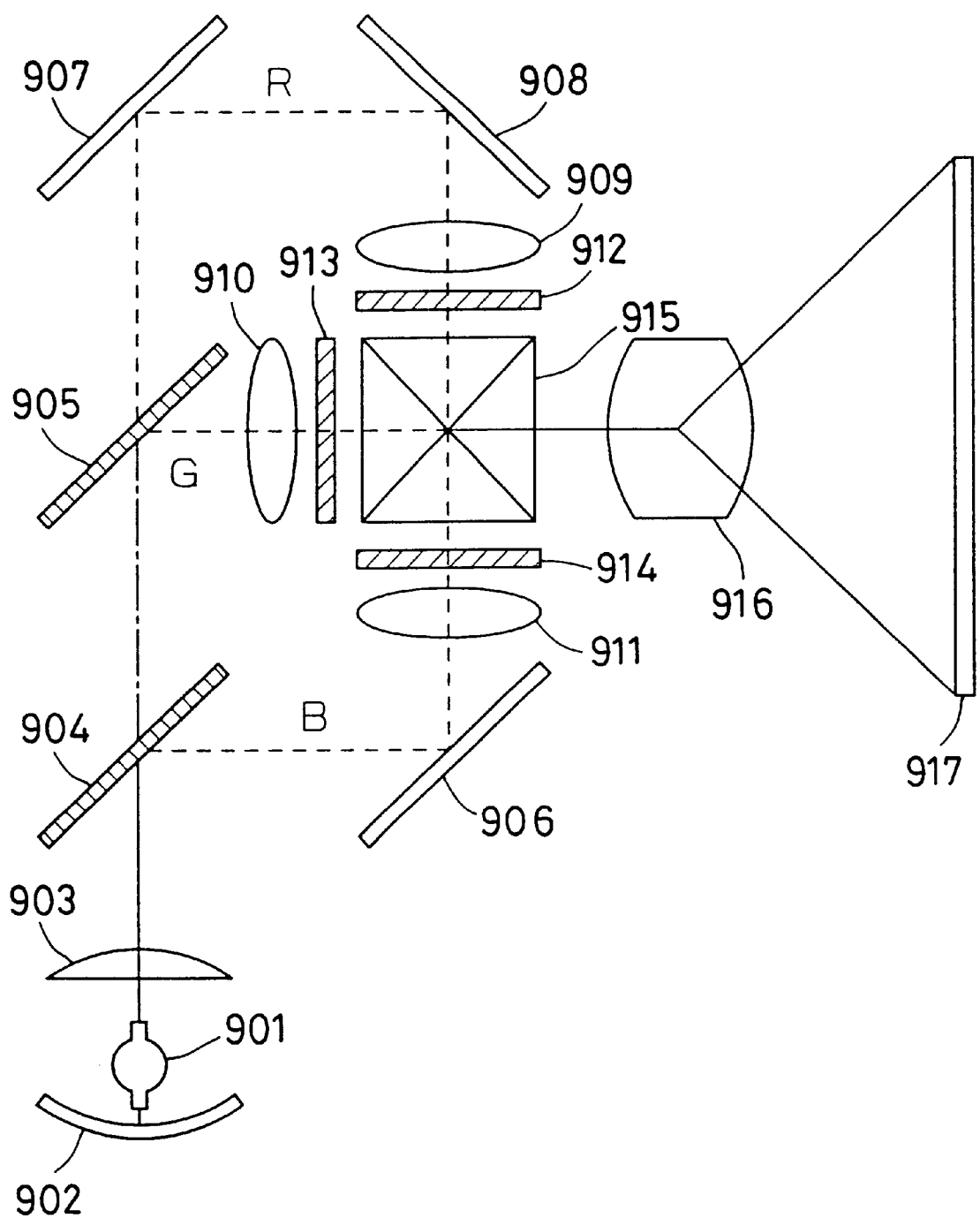
FIG. 21 is a view showing a configuration of one example of a conventional three-plate system color image display apparatus.
Figure 22:
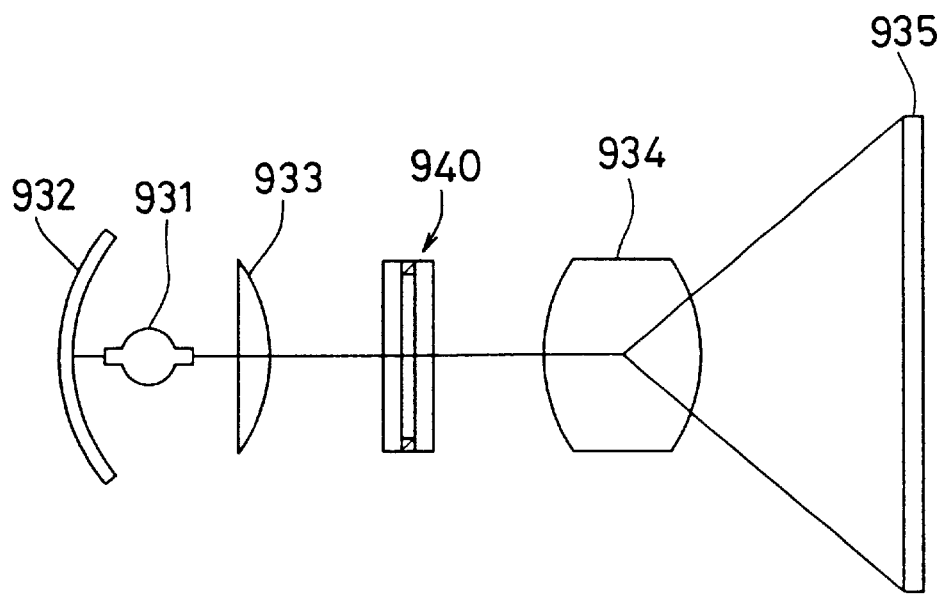
FIG. 22 is a view showing a configuration of one example of a conventional single-plate system color image display apparatus.
Figure 23:
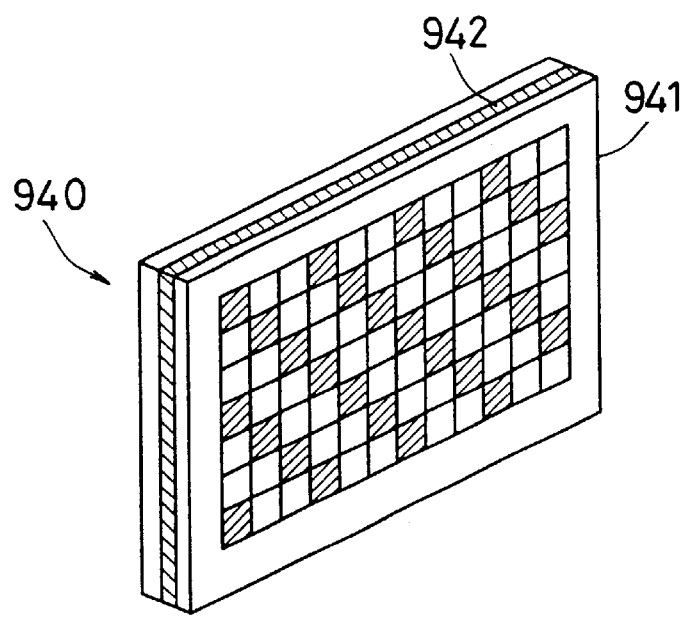
FIG. 23 is a perspective view showing a schematic configuration of a liquid crystal panel used in the color image display apparatus of FIG. 22.

FIG. 20 shows a schematic configuration of a projection-type image display apparatus according to the sixth embodiment of the present invention. Component parts that are the same as those in the color image display device of the fifth embodiment described above (see FIG. 15) are indicated by the same reference numerals, and the detailed description thereof will be omitted here.

In FIG. 20, numeral 521 denotes a projection lens (a projection optical system), and numeral 522 denotes a screen. An image is displayed on the image display panel 204, as is similar to the fifth embodiment, and then is magnified and projected onto the screen 522 using the projection lens 521.

The method for illuminating the image display panel 204 and that for driving the same are the same as those in the color image display device of the fifth embodiment, so the description thereof will be omitted.

Since the projection-type image display apparatus of the present invention has one image display panel, there is no need for a convergence adjusting mechanism, which is necessary when using a plurality of the image display panels. Accordingly, the apparatus can be made smaller and lighter. Also, since a color filter is not used for obtaining the light beams of the primary colors, the efficiency of light utilization can be raised, thus obtaining a bright projection screen. In addition, the images of the overlapping portion of the illuminating light beams are displayed as black, thereby achieving a projection-type image display apparatus having excellent color reproducibility.

Although the transmission-type light valve has been used as the image display panel 204 as an example in the present embodiment, it should be clear that a reflection-type light valve may be used.

In addition, although the projection-type image display apparatus has been constituted in the present embodiment by combining the image display device of the fifth embodiment with the projection optical system, the projection-type image display apparatus of the present invention is not limited to the above. By combining any of the image display devices of the first to fourth embodiments with the projection lens as similar to above, the projection-type image display apparatus also can be constituted.

Although the rotating polygon mirror has been used as the optical path turning device in the first to sixth embodiments, the optical path turning device of the present invention is not limited to the above. For example, a similar function can be achieved by rotating a structure using an optical fiber or a prism.

Moreover, although the three light sources emitting the red, green and blue light beams respectively have been used as the light source portion in the first to sixth embodiments, the light source portion of the present invention is not limited to the above. For example, the light source portion also can be constituted by a light source emitting a white light beam including red, green and blue light beams and a color separation optical system for separating the white light beam into the red, green and blue light beams. As the light source emitting the white light beam, a discharge-tube-type light source such as a metal halide lamp or a high-pressure mercury-vapor lamp can be used. In addition, as the color separation optical system, a well known optical system in which dichroic mirrors transmitting (or reflecting) only a specific color of light are combined can be used, for example.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A color image display device comprising:
    a light source portion for emitting respective light beams of red, green and blue;
    an image display panel provided with many pixels for modulating an incident light according to color signals of at least red, green and blue;
    an optical system for directing the respective light beams to enter the image display panel so that the respective light beams from the light source portion form belt-like illuminated regions at different positions on the image display panel and the regions illuminated by the respective light beams move continuously on the image display panel; and an image display panel driving circuit for driving each of the pixels of the image display panel;

wherein each of the pixels is driven by a signal corresponding to a color of light entering this pixel, thereby displaying a color image, the respective light beams are directed to enter the image display panel so that the illuminated regions adjacent to each other on the image display panel partially overlap each other, and the pixel that the light beams of the overlapping two colors enter is driven by a brightness signal component.

2. The color image display device according to claim 1, further comprising a video signal processing circuit in which the color signals of red, green and blue are inputted, the brightness signal component is detected from the color signals, and signals obtained by subtracting the brightness signal component from the color signals and the brightness signal component are outputted to the image display panel driving circuit.

3. The color image display device according to claim 1, wherein the optical system comprises a first optical system that the respective light beams from the light source portion enter, a rotating polygon mirror that has a plurality of reflecting surfaces and makes the respective light beams perform a scanning when the respective light beams having left the first optical system enter the reflecting surface and are reflected, and a second optical system for directing the respective light beams from the rotating polygon mirror to the image display panel, and chief rays of the respective light beams having left the first optical system enter the reflecting surface of the rotating polygon mirror at different positions from each other in a rotation direction of the rotating polygon mirror at different incident angles from each other, whereby the chief rays of the respective light beams reflected by the reflecting surface enter the second optical system at different angles from each other, and then enter the image display panel at different positions.

4. The color image display device according to claim 1, wherein the optical system comprises a first optical system that the respective light beams from the light source portion enter, an optical path turning device for switching optical paths of the respective light beams having left the first optical system in synchronization with a video signal, and a second optical system for directing the respective light beams having left the optical path turning device to the image display panel.

5. The color image display device according to claim 4, wherein the optical path turning device switches the optical paths of the respective light beams by rotating a structure using an optical fiber, a polygon mirror or a prism.

6. The color image display device according to claim 1, wherein the image display panel is a transmission-type light valve.

7. A The color image display device according to claim 1, wherein the image display panel is a reflection-type light valve.

8. A projection-type image display apparatus comprising the color image display device according to claim 1 and a projection optical system for magnifying and projecting an image of the image display panel.

9. A color image display device comprising:

a light source portion for emitting respective light beams of red, green and blue;

an image display panel provided with many pixels for modulating an incident light according to color signals of at least red, green and blue;

an optical system for directing the respective light beams to enter the image display panel so that the respective light beams from the light source portion form belt-like illuminated regions at different positions on the image display panel and the regions illuminated by the respective light beams move continuously on the image display panel; and an image display panel driving circuit for driving each of the pixels of the image display panel;

wherein each of the pixels is driven by a signal corresponding to a color of light entering this pixel, thereby displaying a color image, and the color image display device further comprises a drive timing adjusting circuit for adjusting a timing of the signal that drives each of the pixels so as to correspond to a change of the color of light entering this pixel.

10. The color image display device according to claim 9, wherein the drive timing adjusting circuit comprises a test pattern switching controlling circuit provided with a circuit for outputting a test pattern signal and a switch circuit for selecting either the test pattern signal or an inputted video signal, and a delay controlling circuit for delaying an output signal of the test pattern switching controlling circuit for an arbitrary time.

11. The color image display device according to claim 9, wherein the respective light beams are directed to enter the image display panel so that the illuminated regions adjacent to each other on the image display panel partially overlap each other, and the pixel that the light beams of the overlapping two colors enter is driven by a brightness signal component.

12. The color image display device according to claim 11, further comprising a video signal processing circuit in which the color signals of red, green and blue are inputted, the brightness signal component is detected from the color signal, and signals obtained by subtracting the brightness signal component from the color signals and the brightness signal component are outputted to the image display panel driving circuit.

13. The color image display device according to claim 9, wherein a black display belt is formed in a border of the illuminated regions adjacent to each other on the image display panel, and the pixel outside the black display belt is driven by the signal corresponding to the color of light entering this pixel.

14. The color image display device according to claim 9, wherein the optical system comprises a first optical system that the respective light beams from the light source portion enter, a rotating polygon mirror that has a plurality of reflecting surfaces and makes the respective light beams perform a scanning when the respective light beams having left the first optical system enter the reflecting surface and are reflected, and a second optical system for directing the respective light beams from the rotating polygon mirror to the image display panel, and chief rays of the respective light beams having left the first optical system enter the reflecting surface of the rotating polygon mirror at different positions from each other in a rotation direction of the rotating polygon mirror at different incident angles from each other, whereby the chief rays of the respective light beams reflected by the reflecting surface enter the second optical system at different angles from each other, and then enter the image display panel at different positions.

15. The color image display device according to claim 9, wherein the optical system comprises a first optical system that the respective light beams from the light source portion enter, an optical path turning device for switching optical paths of the respective light beams having left the first optical system in synchronization with a video signal, and a second optical system for directing the respective light beams having left the optical path turning device to the image display panel.

16. The color image display device according to claim 9, wherein the image display panel is a transmission-type light valve.

17. The color image display device according to claim 9, wherein the image display panel is a reflection-type light valve.

18. A projection-type image display apparatus comprising the color image display device according to claim 9, and a projection optical system for magnifying and projecting an image of the image display panel.

19. A color image display device comprising:
   a light source portion for emitting respective light beams of red, green and blue;
   an image display panel provided with many pixels for modulating an incident light according to color signals of at least red, green and blue;
   an optical system for directing the respective light beams to enter the image display panel so that the respective light beams from the light source portion form belt-like illuminated regions at different positions on the image display panel and the regions illuminated by the respective light beams move continuously on the image display panel; and
   an image display panel driving circuit for driving each of the pixels of the image display panel;
   wherein each of the pixels is driven by a signal corresponding to a color of light entering this pixel, thereby displaying a color image,
   the optical system comprises a first optical system that the respective light beams from the light source portion enter, a rotating polygon mirror that has a plurality of reflecting surfaces and makes the respective light beams perform a scanning when the respective light beams having left the first optical system enter the reflecting surface and are reflected, and a second optical system for directing the respective light beams from the rotating polygon mirror to the image display panel,
   chief rays of the respective light beams having left the first optical system enter the reflecting surface of the rotating polygon mirror at different positions from each other in a rotation direction of the rotating polygon mirror at different incident angles from each other, whereby the chief rays of the respective light beams reflected by the reflecting surface enter the second optical system at different angles from each other, and then enter the image display panel at different positions, and
   the first optical system has an adjusting mechanism for adjusting the incident angles at which the chief rays of the respective light beams having left the first optical system enter the reflecting surface of the rotating polygon mirror, for each of the light beams.

20. The color image display device according to claim 19, wherein the respective light beams are directed to enter the image display panel so that the illuminated regions adjacent to each other on the image display panel partially overlap each other, and the pixel that the light beams of the overlapping two colors enter is driven by a brightness signal component.

21. The color image display device according to claim 19, wherein a black display belt is formed in a border of the illuminated regions adjacent to each other on the image display panel, and the pixel outside the black display belt is driven by the signal corresponding to the color of light entering this pixel.

22. The color image display device according to claim 19, wherein the image display panel is a transmission-type light valve.

23. The color image display device according to claim 19, wherein the image display panel is a reflection-type light valve.

24. A projection-type image display apparatus comprising the color image display device according to claim 19 and a projection optical system for magnifying and projecting an image of the image display panel.

25. A color image display device comprising:
   a light source portion for emitting respective light beams of red, green and blue;
   an image display panel provided with many pixels for modulating an incident light according to color signals of at least red, green and blue;
   an optical system for directing the respective light beams to enter the image display panel so that the respective light beams from the light source portion form belt-like illuminated regions at different positions on the image display panel and the regions illuminated by the respective light beams move continuously on the image display panel; and
   an image display panel driving circuit for driving each of the pixels of the image display panel;
   wherein a black display belt is formed in a border of the illuminated regions adjacent to each other on the image display panel, and the pixel outside the black display belt is driven by a signal corresponding to a color of light entering this pixel.

26. The color image display device according to claim 25, wherein the optical system comprises a first optical system that the respective light beams from the light source portion enter, a rotating polygon mirror that has a plurality of reflecting surfaces and makes the respective light beams perform a scanning when the respective light beams having left the first optical system enter the reflecting surface and are reflected, and a second optical system for directing the respective light beams from the rotating polygon mirror to the image display panel, and
   chief rays of the respective light beams having left the first optical system enter the reflecting surface of the rotating polygon mirror at different positions from each other in a rotation direction of the rotating polygon mirror at different incident angles from each other, whereby the chief rays of the respective light beams reflected by the reflecting surface enter the second optical system at different angles from each other, and then enter the image display panel at different positions.

27. The color image display device according to claim 25, wherein the optical system comprises a first optical system that the respective light beams from the light source portion enter, an optical path turning device for switching optical paths of the respective light beams having left the first optical system in synchronization with a video signal, and a second optical system for directing the respective light beams having left the optical path turning device to the image display panel.

28. The color image display device according to claim 25, wherein the image display panel is a transmission-type light valve.

29. The color image display device according to claim 25, wherein the image display panel is a reflection-type light valve.

30. A projection-type image display apparatus comprising the color image display device according to claim 25 and a projection optical system for magnifying and projecting an image of the image display panel.

* * * * *